United States Patent
Younggren et al.

(10) Patent No.: US 10,626,929 B2
(45) Date of Patent: Apr. 21, 2020

(54) DUAL CLUTCH

(71) Applicant: TEAM Industries, Inc., Bagley, MN (US)

(72) Inventors: Bruce H. Younggren, Bemidji, MN (US); Ronald Joseph Wendt, Bemidji, MN (US); Brandon P. Lenk, Shevlin, MN (US); Jeffrey Joseph Haack, Bemidji, MN (US); Thomas Richard Rosenbush, Bagley, MN (US); Michael Allen Mueller, Bemidji, MN (US)

(73) Assignee: TEAM Industries, Inc., Bagley, MN (US)

( * ) Notice: Subject to any disclaimer, the term of this patent is extended or adjusted under 35 U.S.C. 154(b) by 252 days.

(21) Appl. No.: 15/590,906

(22) Filed: May 9, 2017

(65) Prior Publication Data
US 2017/0321763 A1 Nov. 9, 2017

Related U.S. Application Data

(60) Provisional application No. 62/333,654, filed on May 9, 2016.

(51) Int. Cl.
*F16D 23/12* (2006.01)
*F16D 21/06* (2006.01)
(Continued)

(52) U.S. Cl.
CPC ............ *F16D 23/12* (2013.01); *F16D 13/385* (2013.01); *F16D 13/52* (2013.01); *F16D 21/06* (2013.01);
(Continued)

(58) Field of Classification Search
CPC .... F16D 23/12; F16D 2023/123; F16D 21/06; F16D 2021/063; F16D 2021/0638;
(Continued)

(56) References Cited

U.S. PATENT DOCUMENTS 5,590,563 A   1/1997  Kuwahata et al.
6,085,607 A   7/2000  Narita et al.
(Continued)

FOREIGN PATENT DOCUMENTS

DE   102004001569 A1   7/2004
DE   102007007468 A1 * 6/2008   ............ F16D 27/115
(Continued)

OTHER PUBLICATIONS

Autos Weblog, "Dual Clutch Transmission.html", "http://www.autosweblog.com/cat/dual-clutch-transmission.html", Jan. 20, 2017, pp. 17.
(Continued)

*Primary Examiner* — Jacob S. Scot
*Assistant Examiner* — Lori Wu
(74) *Attorney, Agent, or Firm* — Fogg & Powers LLC

(57) ABSTRACT

A dual clutch that includes a first clutch, a second clutch, a ball ramp assembly and at least one actuator is provided. The first clutch engages and disengages a first set of gears. The second clutch engages and disengages a second set of gears. The at least one ball ramp assembly includes at least one ball, first member and a second member. The first member includes a ball pocket for each ball. The second member has at least one ball ramp. The at least one ball partially received in an associated ball pocket of the first member and ball ramp of the second member. The at least one actuator is configured and arranged to rotate one of the first member and the second member to cause the at least one ball ramp assembly to activate at least one of the first clutch and the second clutch.

8 Claims, 26 Drawing Sheets

(51) Int. Cl.
*F16D 13/38* (2006.01)
*F16D 13/52* (2006.01)
*F16D 48/00* (2006.01)
*F16H 57/02* (2012.01)
*F16H 59/04* (2006.01)

(52) U.S. Cl.
CPC ............. *F16D 48/00* (2013.01); *F16H 57/02* (2013.01); *F16H 59/04* (2013.01); *F16D 2023/123* (2013.01); *F16H 2057/02043* (2013.01)

(58) Field of Classification Search
CPC ............. F16D 2021/0646; F16D 13/38; F16D 13/385; F16D 13/52; F16D 48/00; F16H 57/02; F16H 59/04; F16H 2057/02043
See application file for complete search history.

(56) References Cited

U.S. PATENT DOCUMENTS

| | | | |
|---|---|---|---|
| 6,742,642 B1* | 6/2004 | Stevenson | F16D 13/04 192/54.52 |
| 6,887,184 B2 | 5/2005 | Buchanan et al. | |
| 7,752,932 B2 | 7/2010 | Chen et al. | |
| 8,037,779 B2 | 10/2011 | Shiozaki et al. | |
| 8,042,419 B2 | 10/2011 | Mizuno et al. | |
| 8,042,420 B2 | 10/2011 | Tsunashima et al. | |
| 8,057,359 B2 | 11/2011 | Tsukada et al. | |
| 8,109,166 B2 | 2/2012 | Tsukada et al. | |
| 8,127,635 B2 | 3/2012 | Tsukada et al. | |
| 8,235,868 B2 | 8/2012 | Fukaya et al. | |
| 8,555,739 B2 | 10/2013 | Ieda et al. | |
| 8,635,927 B2 | 1/2014 | Akashi et al. | |
| 8,646,349 B2 | 2/2014 | Pesola et al. | |
| 8,678,971 B2* | 3/2014 | Schmidt | F16D 28/00 475/231 |
| 8,930,103 B2 | 1/2015 | Faust | |
| 9,016,154 B2 | 4/2015 | Pregnolato et al. | |
| 9,550,417 B2 | 1/2017 | Fujimoto et al. | |
| 2004/0166991 A1 | 8/2004 | Buchanan et al. | |
| 2005/0205376 A1* | 9/2005 | Kemper | F16D 21/06 192/48.2 |
| 2007/0144861 A1* | 6/2007 | Yamasaki | F16D 13/54 192/70.23 |
| 2008/0220936 A1 | 9/2008 | Kobayashi et al. | |
| 2011/0005345 A1* | 1/2011 | Reisch | F16D 21/06 74/473.36 |
| 2011/0190990 A1 | 8/2011 | Nedachi et al. | |
| 2013/0091984 A1 | 4/2013 | Pesola et al. | |
| 2015/0274011 A1 | 10/2015 | Fujimoto et al. | |
| 2017/0059004 A1* | 3/2017 | Petz | F16D 21/06 |
| 2017/0175823 A1* | 6/2017 | Cooper | F16D 23/12 |

FOREIGN PATENT DOCUMENTS

| | | |
|---|---|---|
| DE | 102007053416 A1 | 5/2009 |
| DE | 102014206985 A1 | 10/2014 |
| EP | 1801442 A1 | 6/2007 |
| EP | 2042766 | 2/2011 |
| GB | 239426 | 9/1925 |
| GB | 2394261 | 4/2004 |
| JP | 2012007659 | 1/2012 |
| JP | 2014070686 | 4/2014 |
| WO | 2013186102 A1 | 12/2013 |

OTHER PUBLICATIONS

International Searching Authority, "International Search Report", "from PCT Application No. PCT/US2017/031818 filed May 9, 2017", "from Foreign Counterpart of U.S. Appl. No. 15/590,906", dated Nov. 2, 2017, pp. 1-18, Published in: WO.

International Searching Authority, "Invitation to pay Additional Fees/ Protest Fee", "from PCT Application No. PCT/US2017/031818 filed May 9, 2017", "from Foreign Counterpart of U.S. Appl. No. 15/590,906", dated Aug. 16, 2017, pp. 1-12, Published in: WO.

* cited by examiner

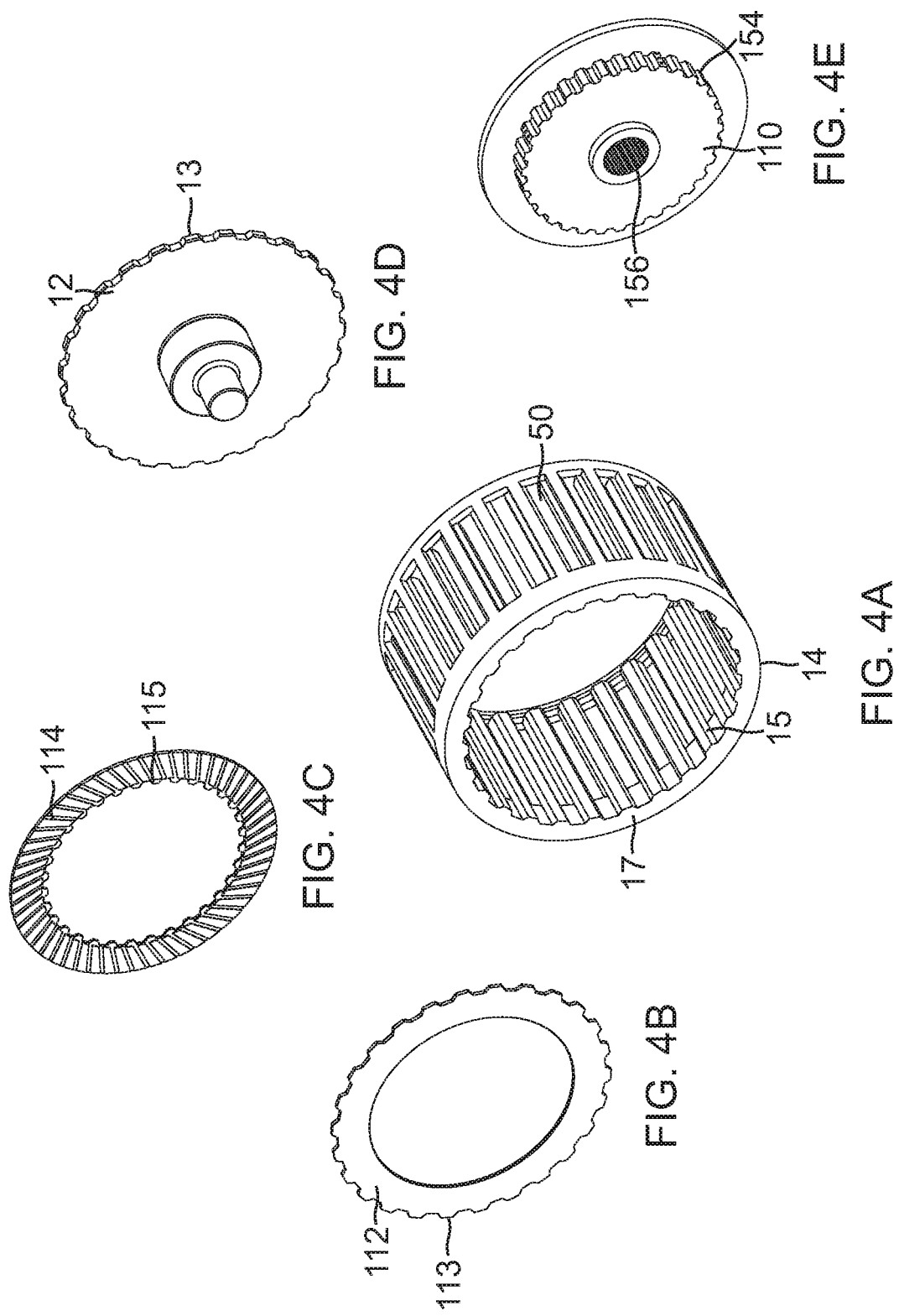

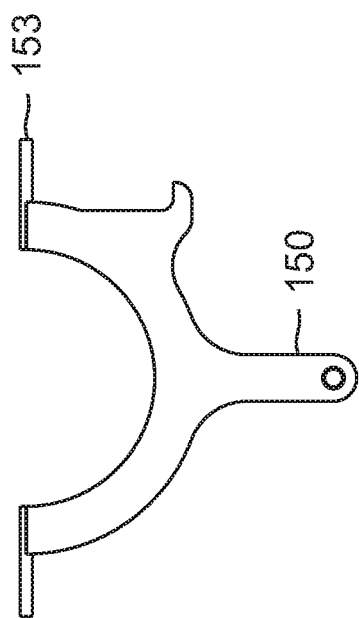

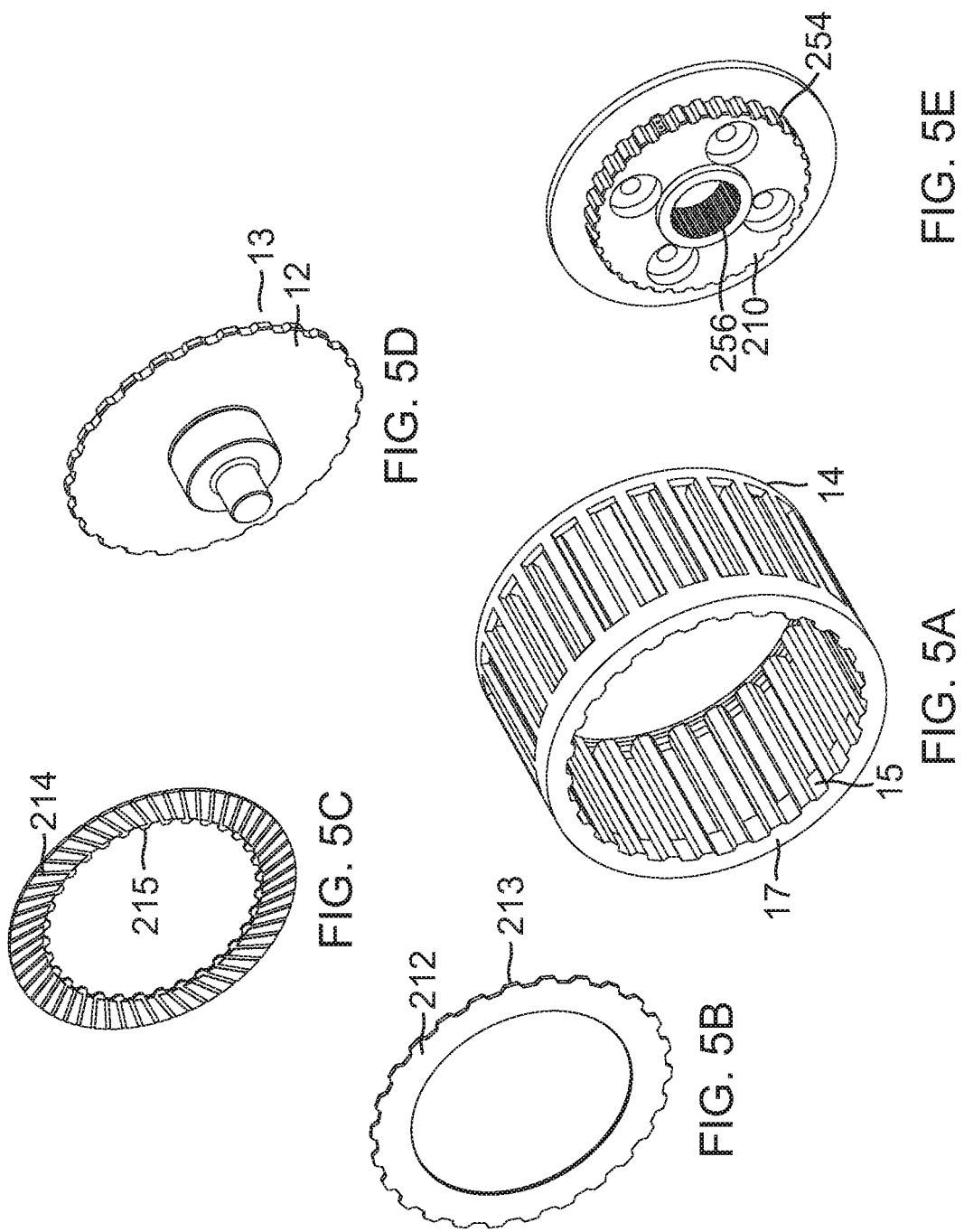

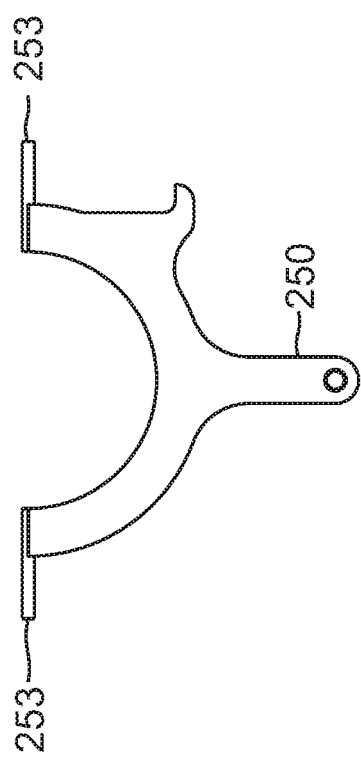

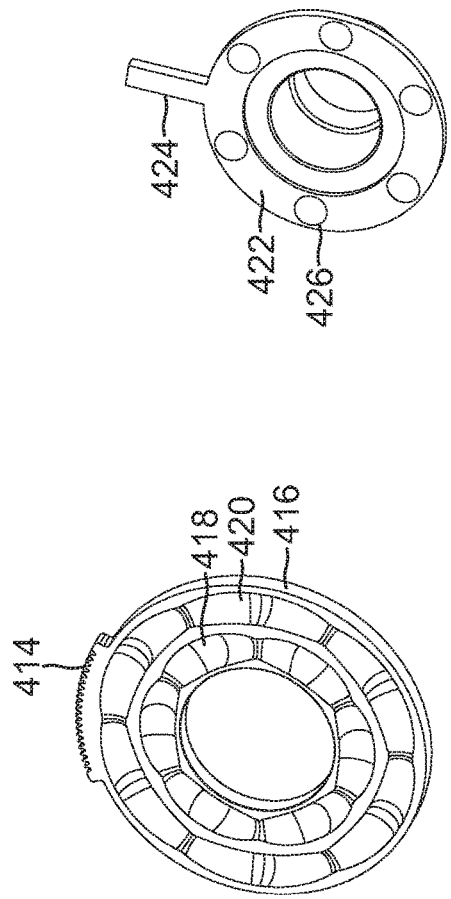
FIG. 6C
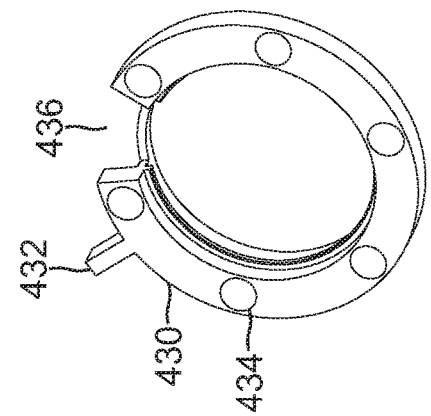
FIG. 6E
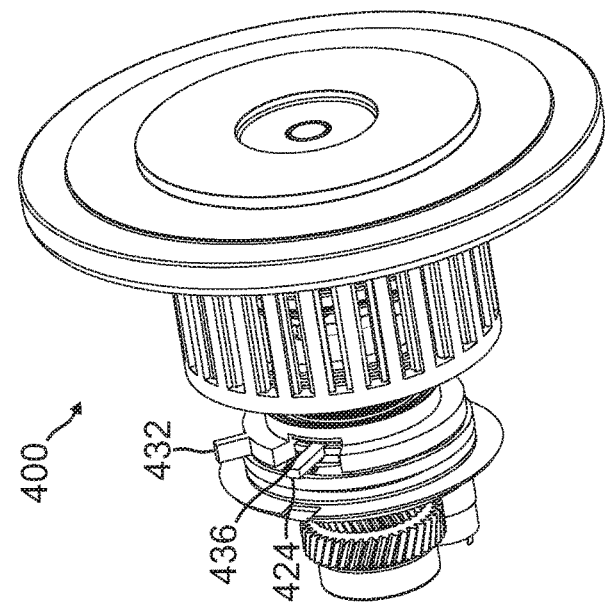
FIG. 6D
FIG. 6B

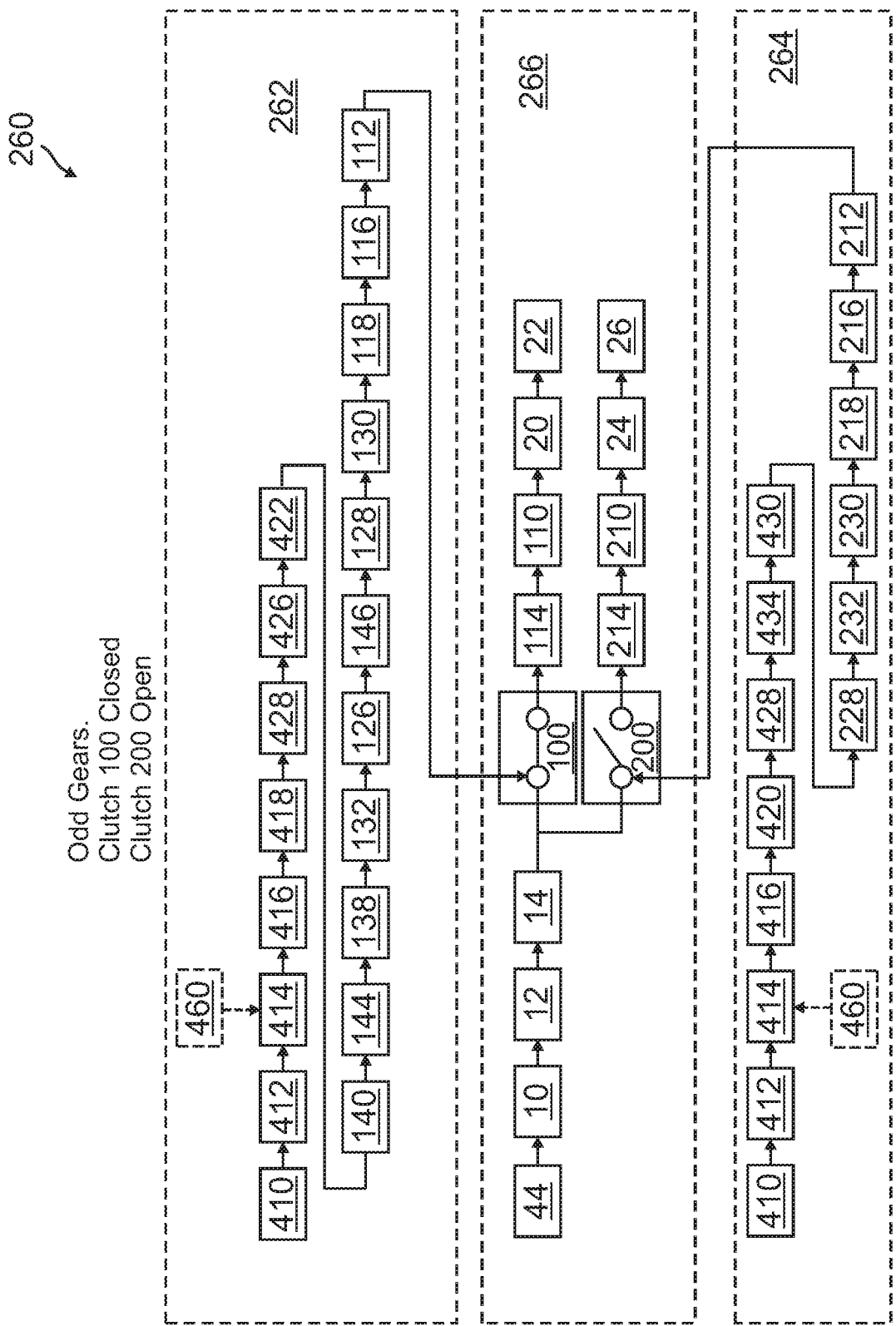

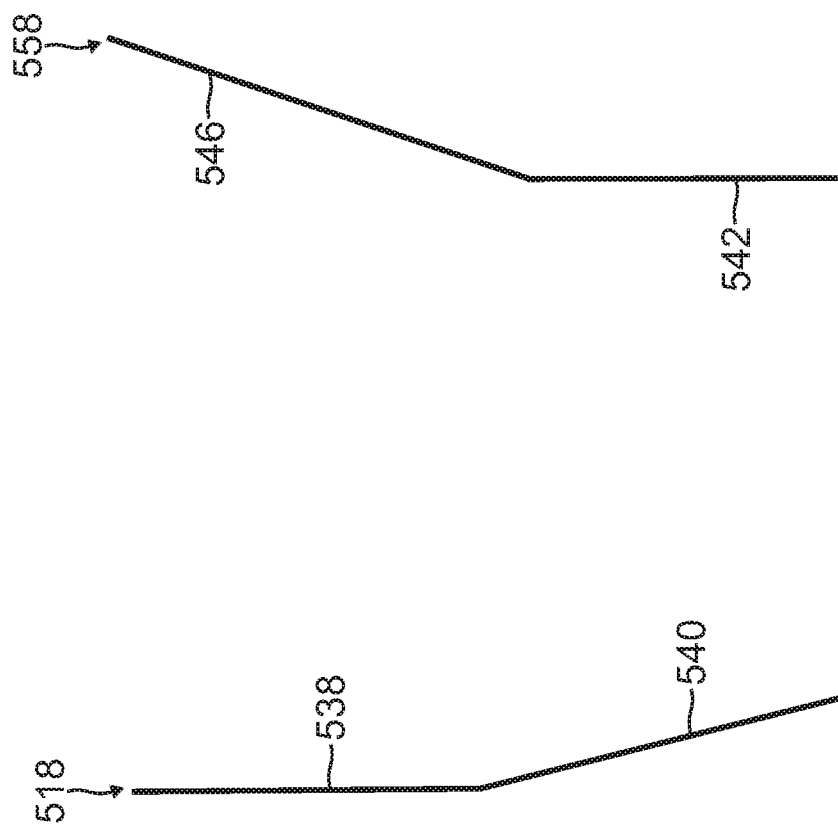

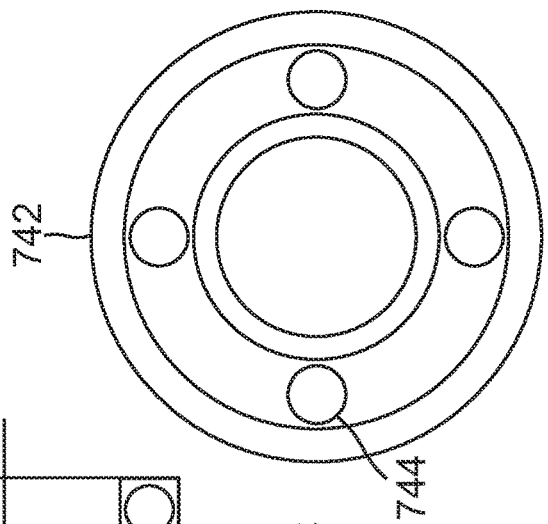
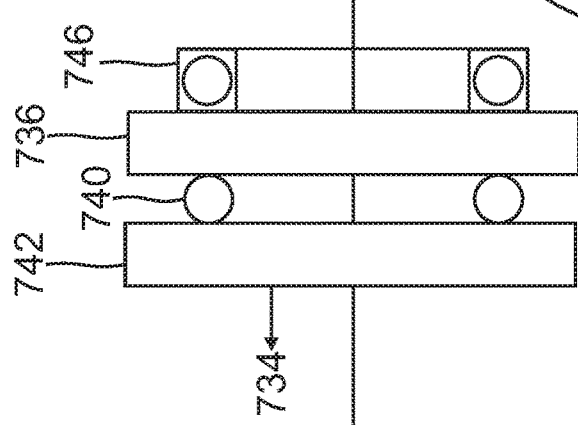
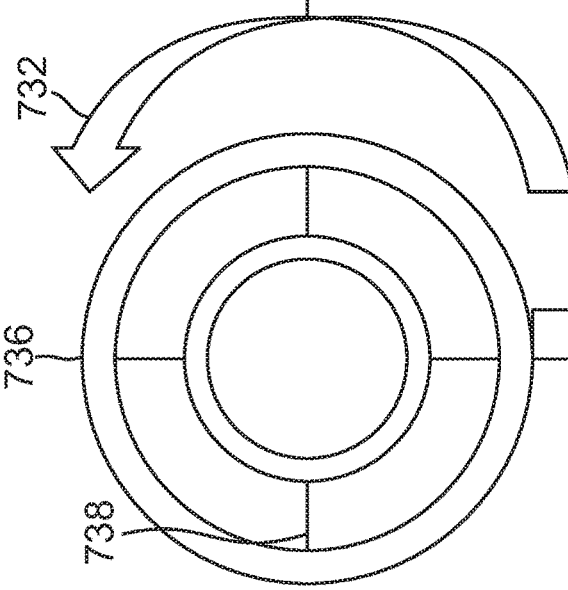
FIG. 10A
FIG. 10C
FIG. 10B
FIG. 10D

DUAL CLUTCH

CROSS-REFERENCE TO RELATED APPLICATIONS

This Application claims priority to U.S. Provisional Application Ser. No. 62/333,654, same title herewith, filed on May 9, 2016 which is incorporated in its entirety herein by reference.

BACKGROUND

A dual clutch transmission provides the function of two manual gear boxes in one. In a typical dual clutch transmission for a motorized vehicle that has multiple gears, odd gears (first, third, fifth . . . ) are controlled by one clutch and the even gears (second, fourth, sixth . . . ) are controlled by a second independent clutch. Typically sophisticated electronics and hydraulics are used to control the operation of the clutches. In a typical dual clutch transmission arrangement, gears can be changed without interrupting the power flow from the engine to the transmission during an upshift or downshift by synchronizing the timing of the disengagement of one gear and the engagement of another gear via control of the first and second clutches.

SUMMARY OF INVENTION

The present invention and will be understood by reading and studying the following specification. The following summary is made by way of example and not by way of limitation. It is merely provided to aid the reader in understanding some of the aspects of the invention. Embodiments provide a dual clutch with an activation system.

In one embodiment, a dual clutch is provided. The dual clutch includes a first clutch, a second clutch, at least one ramp assembly and at least one actuator. The first clutch is configured to engage and disengage a first set of gears. The second clutch is configured to engage and disengage a second set of gears. The least one ramp assembly is configured to selectively activate at least one of the first clutch and the second clutch. The at least one ramp assembly includes a first member and a second member. The first member has at least one of at least one ball pocket and at least one ball ramp. The second member has at least one of at least one ball pocket and at least one ramp. The at least one actuator is configured and arranged to rotate one of the first member and the second member to cause the at least one ramp assembly to activate at least one of the first clutch and the second clutch.

In another embodiment, another dual clutch is provided. The dual clutch includes a first clutch, a second clutch and at least one actuator. The first clutch is configured to engage and disengage a first set of gears. The second clutch is configured to engage and disengage a second set of gears. The least one actuator is configured and arranged to engage a lever system to selectively activate the first and second clutch based on control signals from a transmission control module.

In another embodiment, a vehicle is provided. The vehicle includes an engine, a transmission, a dual clutch, at least one actuator, at least one transmission control unit and at least one wheel. The engine is used to provide engine torque. The transmission is in operational communication with the engine to receive the engine torque. The transmission has a first set of gears and a second set of gears. The dual clutch includes a first clutch, a second clutch and at least one ball ramp assembly. The first clutch is configured to engage and disengage the engine torque to the first set of gears. The second clutch is configured to engage and disengage the engine torque to the second set of gears. The at least one ball ramp assembly is configured to selectively activate at least one of the first clutch and the second clutch. The at least one ball ramp assembly including at least one ball, a first member and a second member. The first member includes a ball pocket for each ball. The second member has at least one ball ramp. The at least one ball is partially received in an associated ball pocket and ball ramp. The at least one actuator is configured and arranged to rotate one of the first member and the second member to cause the at least one ball ramp assembly to activate at least one of the first clutch and the second clutch. The transmission control unit is configured to control operation of the at least one ball ramp assembly via the at least one actuator to selectively engage and disengage the first and second clutches. The at least one wheel operationally coupled to the at least one transmission.

In another embodiment, a method of operating a dual clutch is provided. The method includes, upon receiving an engagement signal for a select transmission gear associated with one of a first and a second clutch in the dual clutch, activating an actuator that is in operational communication with a ball ramp assembly. A first member of the ball ramp assembly is rotated as a result of the engagement signal to create a linear force with the ball ramp assembly. The created linear force is applied to the one of the first and second clutch to engage the select transmission gear.

BRIEF DESCRIPTION OF THE DRAWINGS

The present invention can be more easily understood and further advantages and uses thereof will be more readily apparent, when considered in view of the detailed description and the following figures in which:

FIG. 4A is a side perspective view a clutch basket of an exemplary embodiment;

FIG. 4B is a side perspective view of a reaction plate of an exemplary embodiment;

FIG. 4C is a side perspective view of a friction plate of an exemplary embodiment;

FIG. 4D is a side perspective view of a clutch basket hub of an exemplary embodiment;

FIG. 4E is a side perspective view of a first inner clutch basket of an exemplary embodiment;

FIG. 4F is a side perspective view of a first shift lever of an exemplary embodiment;

FIG. 5A is a side perspective view a clutch basket of an exemplary embodiment;

FIG. 5B is a side perspective view of a reaction plate of an exemplary embodiment;

FIG. 5C is a side perspective view of a friction plate of an exemplary embodiment;

FIG. 5D is a side perspective view of a clutch basket hub of an exemplary embodiment;

FIG. 5E is a side perspective view of a second inner clutch basket of an exemplary embodiment;

FIG. 5F is a side perspective view of a second shift lever of an exemplary embodiment;

FIG. 6B is a side perspective view of a partial assembled dual clutch of FIG. 6;

FIG. 6C is a side perspective view of a ball ramp body of an exemplary embodiment;

FIG. 6D is a side perspective view of a spring slide of an exemplary embodiment;

FIG. 6E is a side perspective view of a middle bearing slide of an exemplary embodiment;

FIG. 6F illustrates a control and torque flow diagram in an odd gear configuration diagram of an exemplary embodiment;

FIG. 7G illustrates ball ramp profiles of ball ramps of an exemplary embodiment;

FIG. 10A is a front view of a ball ramp body of another exemplary embodiment;

FIG. 10B is an illustration of a rotational movement of the ball ramp body of FIG. 10A;

FIG. 10C is a side view illustration of ramp ball assembly generation a linear force with non-rotational body; and FIG. 10D is an illustration of a ball ramp profile of an exemplary embodiment.

In accordance with common practice, the various described features are not drawn to scale but are drawn to emphasize specific features relevant to the present invention. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Figure 1:
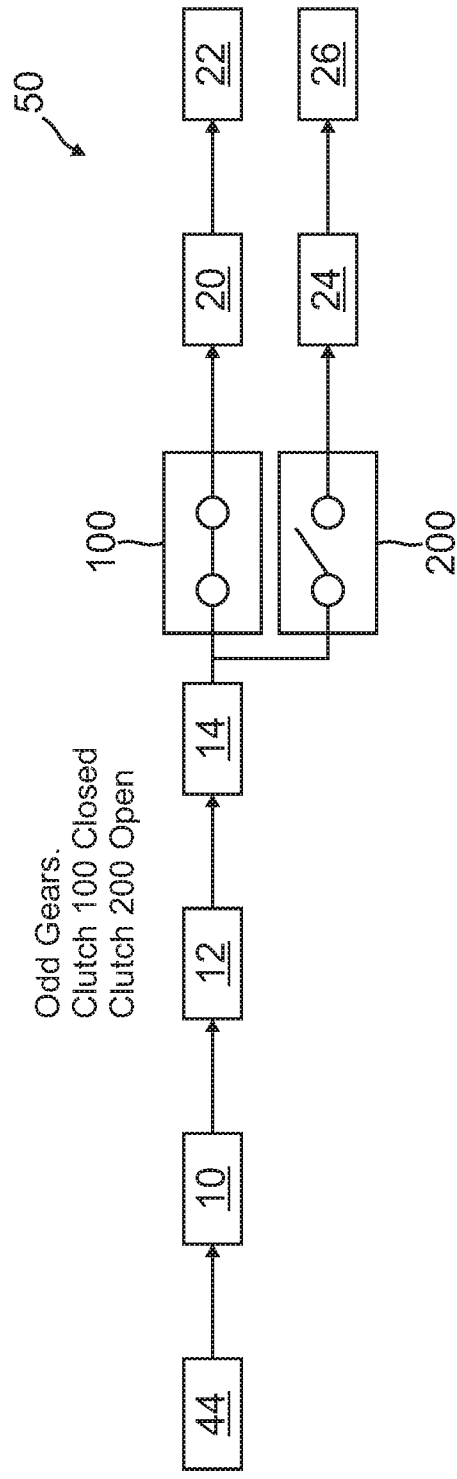
FIG. 1 is an odd gear torque flow diagram of an exemplary embodiment.
Figure 2:
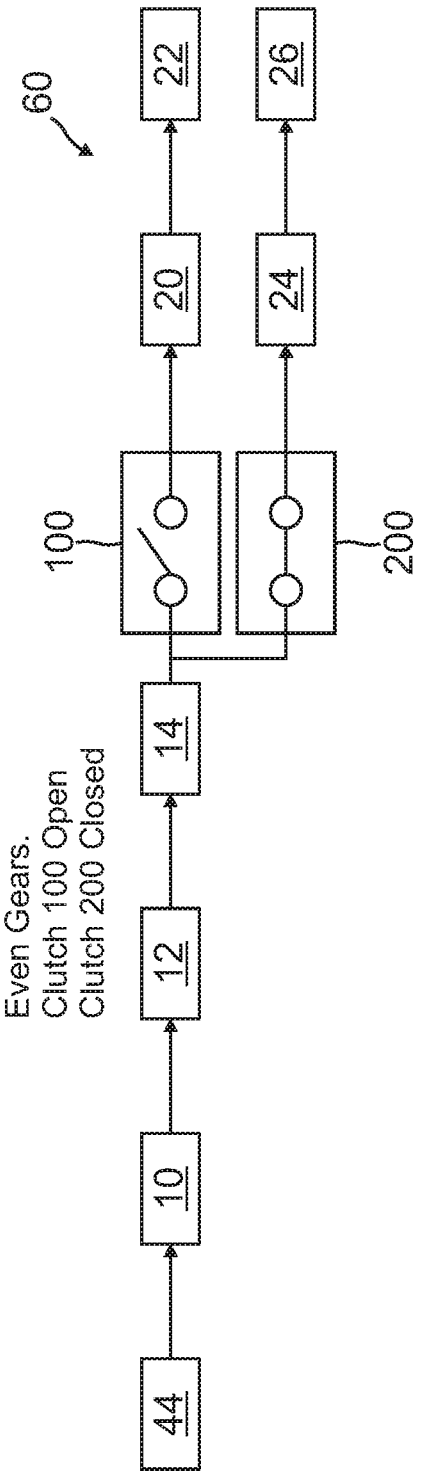
FIG. 2 is an even gear torque flow diagram of an exemplary embodiment.
Figure 8A:
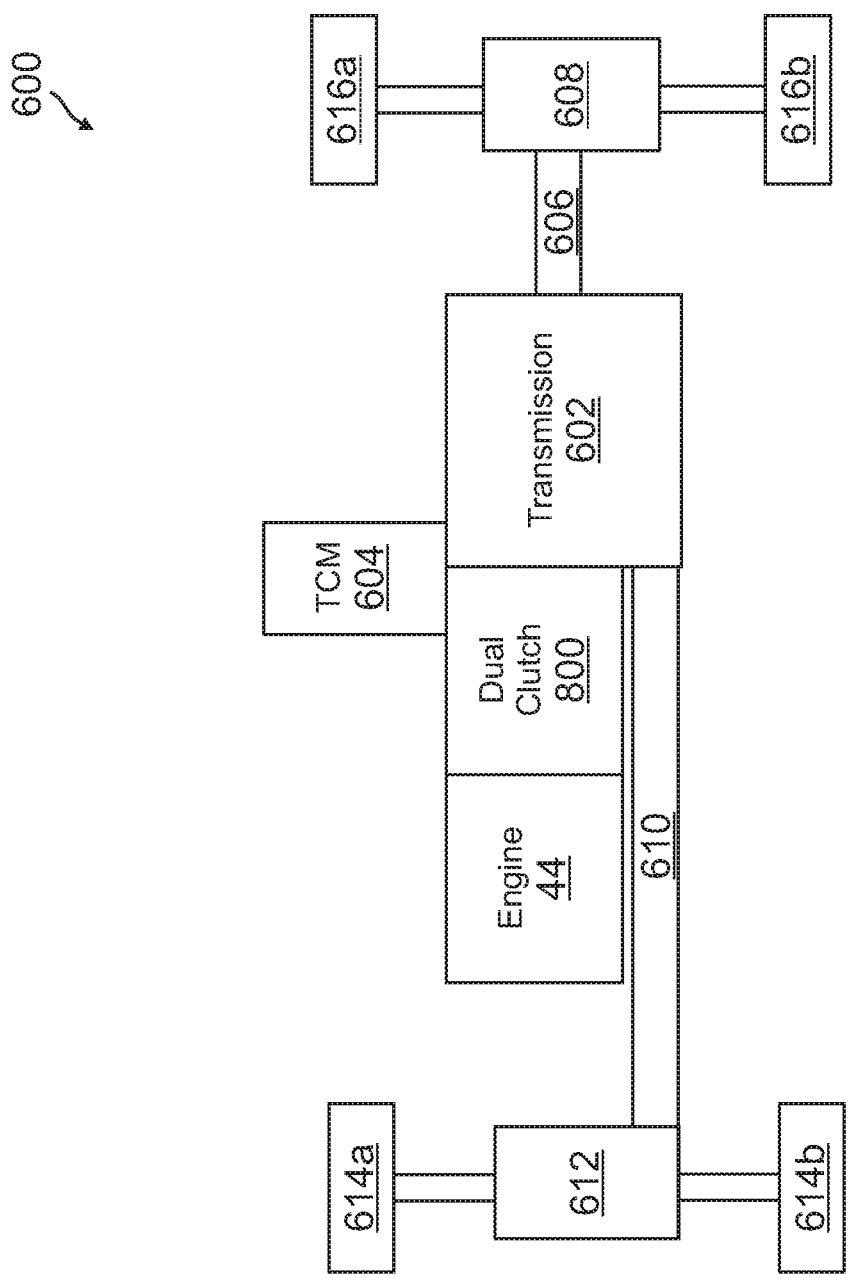
FIG. 8A illustrates a block diagram of a vehicle of one exemplary embodiment.
Figure 8B:
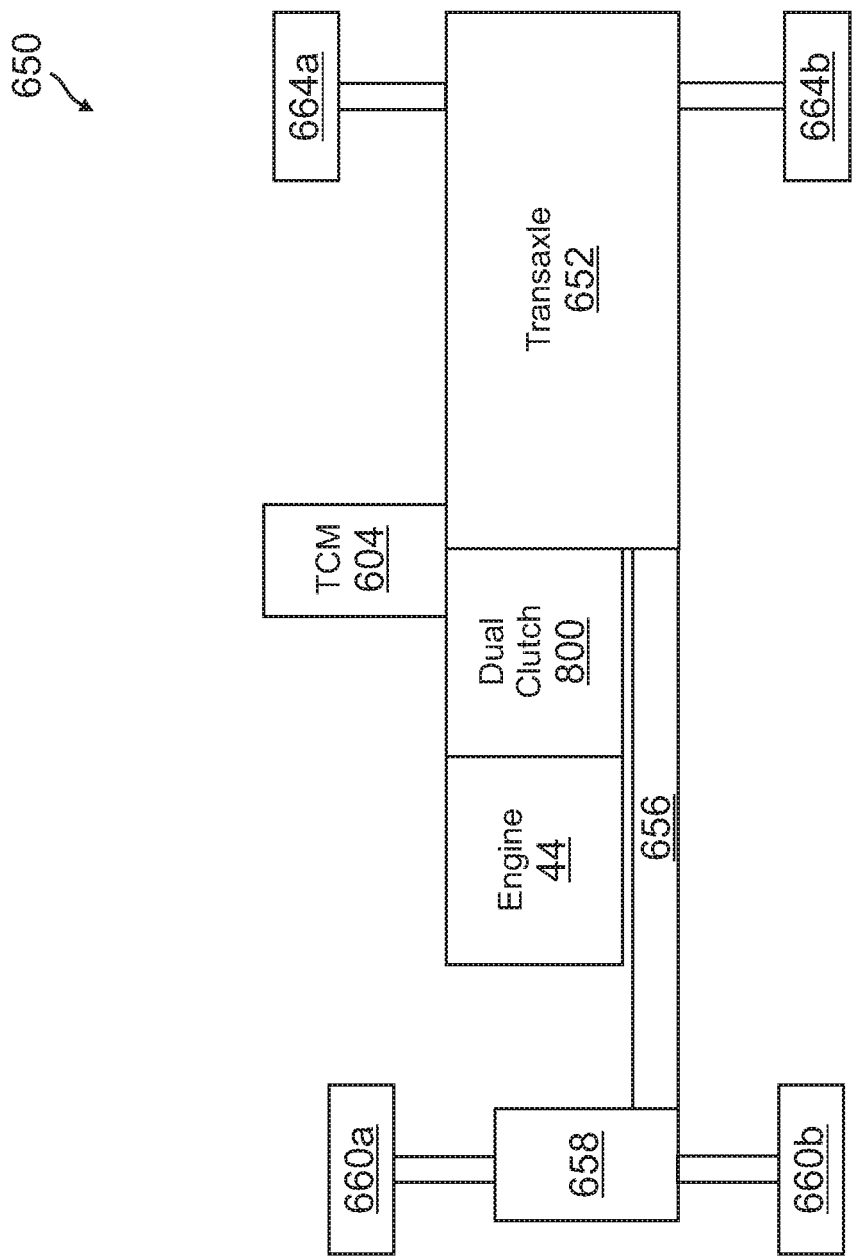
FIG. 8B illustrates another block diagram of a vehicle of one embodiment.

Embodiments of the present invention provide a dual clutch. A description of how torque flows through a dual clutch in an embodiment is provided in view of the torque flow diagrams 50 and 60 of FIGS. 1 and 2. FIG. 1 illustrates an odd gear torque flow diagram 50 and FIG. 2 illustrates an even gear torque flow diagram 60. In an example embodiment a first clutch 100 controls a first set of gear such as the odd gears and a second clutch 200 controls a second set of gear such as the even gears. Moreover, in another embodiment an opposite arrangement is implemented where the first clutch 100 controls the even gears and second clutch 200 controls the odd gears. Either clutch 100 or 200 may control reverse. When a vehicle (examples of a vehicle 600 and 650 are illustrated in FIGS. 8A and 8B) is driven in first gear, the first clutch 100 is closed (engaged) and second clutch 200 is disengaged (open). When a shift to second gear is determined to be necessary either by a transmission control module 604 (illustrated FIGS. 8A and 8B) or a driver, a mechanism moves a dog clutch or a synchronizer to engage the second gear. With the second clutch 200 still open, no power is transmitted through the second gear yet. To make the shift from first gear to second gear, the first clutch 100 disengages or opens while the second clutch 200 is engaging or closing and a smooth shift from first gear to second gear is performed. This is illustrated In FIG. 2. Power is now being transmitted through the second gear. Because first clutch 100 is now open, no power is going through the first gear. When a shift to third gear is determined to be necessary, the process repeats itself and a mechanism moves the correct dog clutch or synchronizer to the third gear and the second clutch 200 disengages or opens while the first clutch 100 is engaging or closing and a smooth shift from second gear to third gear is performed. This process of moving a mechanism to engage a dog clutch or synchronizer then opening one clutch and closing the other repeats for all upshifts and downshifts.

As discussed above, FIG. 1 illustrates an odd gear torque flow diagram 50. FIG. 1 illustrates that the transmission is being driven in odd gears 1, 3, 5 . . . etc. FIG. 2 illustrates the transmission being driven by the even gears 2, 4, 6 . . . etc. Torque is initially generated by an engine 44 and provided to a torsional damper assembly 10. From the torsion damper 10 torque is provide to a clutch basket hub 12 and then to a clutch basket 14. The torque path is the same in both configurations illustrated in FIG. 1 and FIG. 2 up to this point. The torsional damper assembly 10 and clutch basket hub 12 are just one example way to get the power from the motor 44 to the common clutch basket 14. There are numerous ways to connect the clutch basket 14 to the motor 44 and present embodiments are not limited to the torsional damper assembly 10 and clutch basket 12 configuration. Once power is in clutch basket 14, the transmission control module 604 or driver determines if odd or even gears are required and the clutches 100 and 200 are configured accordingly. In the example of FIG. 1, since the first clutch 100 is closed, torque is then transferred through the first clutch 100 to an inner transmission shaft 20 and to an inner transmission gear 22 (that is in rotational communication with an odd gear). In the example of FIG. 2, since the second clutch 200 is closed, torque is then transferred through the second clutch 200 to an outer transmission shaft 24 and to an outer transmission shaft gear 26 (that is in rotational communication with an even gear). This arrangement is further discussed in detail below.

Figure 3:
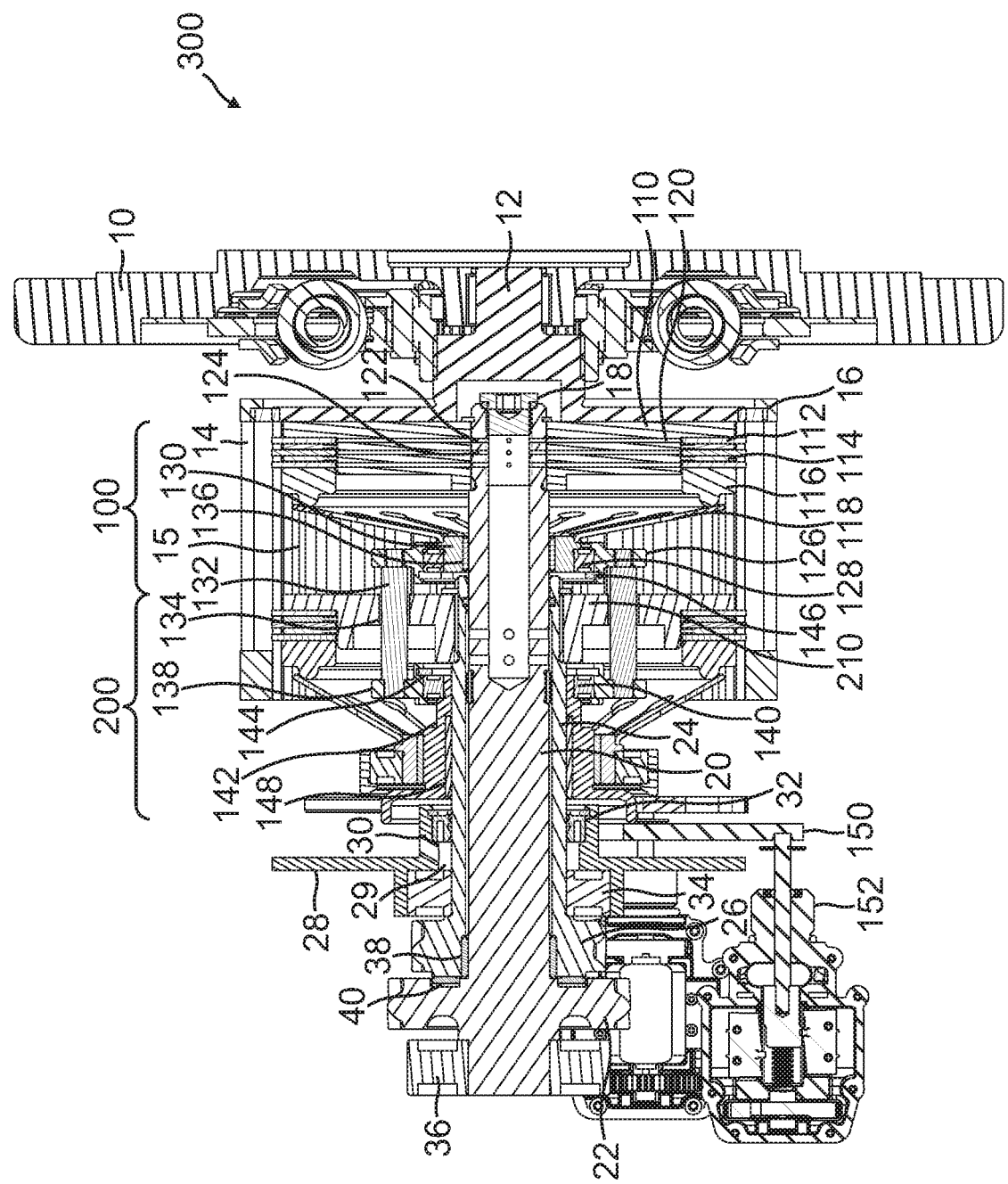
FIG. 3 is a cross-sectional first view of a dual clutch of an exemplary embodiment.
Figure 4:
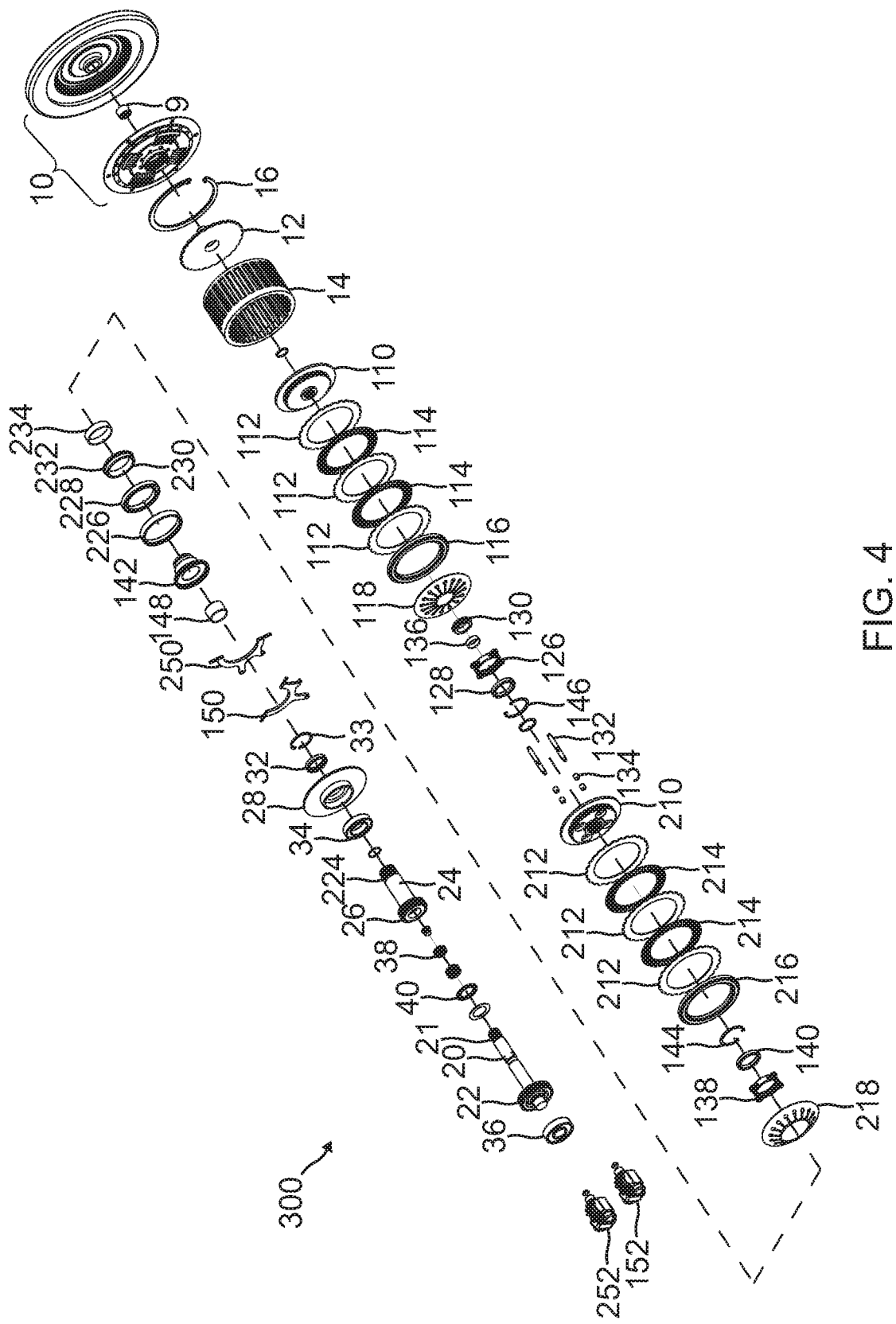
FIG. 4 is an exploded side view of the dual clutch of FIG. 3.

FIG. 3 illustrates a cross-sectional diagram of a dual clutch 300 of an exemplary embodiment. FIG. 4 illustrates an exploded view of the dual clutch 300 of FIG. 3 and FIGS. 4A through 4E illustrates various components of the dual clutch 300. Referring generally to FIG. 4, the dual clutch 300 includes a torsional damper assembly 10 with a bearing 9. Further, the dual clutch 300 includes a retaining ring 16, a clutch basket hub 12 and a clutch basket 14. Received in the clutch basket 14 is a first inner clutch basket 110, a first plurality of stacked reaction plates 112 and friction plates 114, a first pressure plate 116, a first diaphragm biasing member 118, a spring slide 130, an anti-friction element 136, a bearing holder 126, a bearing 128 and a retaining ring 146 that make up in part the first clutch 100. Further received within clutch basket 14 is push rods 132 at that selectively open and close the first clutch 100 and anti-friction elements 134. Further received within the clutch basket 14 is a second inner clutch basket 210. Received around a shoulder of the second inner clutch basket 210 are a second plurality of stacked reaction plates 212 and friction plates 214 that are part of the second clutch 200. The second clutch 200, further includes a second pressure plate 216, retaining ring 144, bearing 140, bearing holder 138, second diaphragm biasing member 218, anti-friction element 234, a spring slide 230 with a spring slide shoulder 232, bearing 228, bearing holder 226, middle bearing side 142 and anti-friction element 148.

The dual clutch 300, further includes first shift lever 150 and a second shift level 250 to selectively manipulate the first and second clutch 100 and 200 respectively as further discussed below. Also included in the dual clutch 300 is retaining ring 33, seal 32, transmission case 28, bearing 34 and an outer transmission shaft 26 with splines 224. The splines 224 of the outer transmission shaft 26 engage splines on the second inner clutch basket 210. Further included in the dual clutch 300 is bearing 38, bearing 40 and the inner transmission shaft 20. The inner transmission shaft 20 includes an inner transmission shaft gear 22 and splines 21. Splines 21 of the inner transmission shaft 20 are engaged with splines on the first inner clutch basket 110. A bearing 36 is further received on the inner transmission shaft 20 proximate the inner transmission shaft gear 22. The dual clutch 300 further includes a first actuator 152 in operational communication to manipulate the first shift lever 150 and a second actuator 252 in operational communication to manipulate the second shift lever 250.

FIG. 4A is an illustration of the clutch basket 14. The clutch basket 14 include a shoulder 17, splines 15 to engage splines 113 of the reaction places 112 and splines 13 of the clutch basket hub 12. An example of a reaction plate 112 is illustrated in FIG. 4B and the clutch basket hub 12 is illustrated in FIG. 4D. FIG. 4C illustrates an example of a friction plate 114. The friction plate 114 includes inner splines 115 to engage outer spines 154 of inner clutch basket 110 illustrated in FIG. 4E. FIG. 4E further illustrates inner splines 156 of the first inner clutch basket 110 that engage splines 21 of the inner transmission shaft 20. FIG. 4F illustrates the first shift lever 150 which is selectively manipulated via the first actuator 152. The first shift lever 150 includes pivot arm 153.

In this example dual clutch 300, the torque comes into the dual clutch 300 via an engine connection to a torsional dampener 10. In some embodiments this engine connection is provided by an engine crankshaft in some fashion whether it be through a torsional damper assembly 10, connecting to the crankshaft directly, connecting to a flywheel or to an adapter to the crankshaft. There are many common ways to connect the dual clutch 300 to the engine 44 and embodiment are not limited to a specific configuration. In one embodiment, a torsional damper assembly 10 connects the dual clutch 300 in some fashion to the crankshaft of the motor whether a direct link such as a spline or bolted to the fly wheel. Any method of connecting the engine 44 (or motor) to the torsional damper assembly 10 or to the dual clutch 300 would work in practice. A gear reduction between the crankshaft and the dual clutch 300 could also be a connection method. If damping of the engine firing pulses is needed (torsional damping) numerous methods could be used such as but not limited to, a torsional damper, a motorcycle compensator type damper or a scissors gear could be used to dampen these firing pulses. Any common method of damping firing pulses would work in practice. A direct link between the dual clutches of the dual clutch 300 and a crankshaft of the motor could also be used. Torsional damping may also be placed between the dual clutches of the dual clutch and the rest of a transmission.

As mentioned above, there are numerous ways to connect the crankshaft of the engine 44 to the dual clutch 300. Described here is one method where a torsional damper assembly 10 is connected either to a flywheel of the engine 44 or directly to the crankshaft of the engine 44. But, numerous other methods could be used and hence, embodiments are not limited to a specific method. Torque (rotational power) comes from the engine 44 to the torsional damper assembly 10 where the torque pulse from the motor are dampened out. The torque then flows from the torsional damper assembly 10 to the clutch basket hub 12. The clutch basket hub 12 is connected to the clutch basket 14 via splined teeth 13 and 15 as shown in FIGS. 4A and 4B. A portion of the spline teeth 15 are machined off the clutch basket 14 so the clutch basket hub 12 has a machined shoulder 17 to locate on and engage. Retaining ring 16 holds the clutch basket hub 12 to the clutch basket 14. Once, the torque is in the clutch basket 14 the torque can either go to the odd gears through clutch 100 or to the even gears through clutch 200. For example, assume a third gear is engaged. In third gear, clutch 200 is open and clutch 100 is closed or engaged. Therefore, torque goes from the clutch basket 14, through the spline teeth 15 in the clutch basket to the spline teeth 113 in the reaction plate 112. With clutch 100 closed, torque is transmitted from the reaction plates 112 to the friction plates 114. Torque flows from the body of the friction plate 114 through the friction plate splines 115 to the inner clutch basket 110 via inner clutch basket splines 154. Torque then flows from inner clutch basket 110 through splines 156 to the mating splines 21 on the inner transmission shaft 20. Once torque is in this shaft it flows to the rest of the transmission via inner transmission shaft gear 22.

Throughout this process, the second clutch 200 is open and is not transmitting any meaningful power.

When a gear shift is determined to be necessary either from the transmission control module 604 or from the driver, the transmission will move an engagement dog or a synchronizer so a second gear or fourth gear is engaged. For example, in shifting from third to fourth gear, initially no power is transmitted through fourth gear because clutch 200 is still open while clutch 100 is closed proving torque to the third gear. Once the engagement dog or synchronizer is engaged, the transmission control module 604 will direct a shift from clutch 100 closed and clutch 200 open to clutch 200 closed and clutch 100 open completing a shift from third to fourth gear.

When the fourth gear or any even gear is engaged, the torque flow from the engine 44 to the transmission changes. Clutch 100 opens and clutch 200 will close. Power (torque) comes from the engine 44 to the torsional damper assembly 10 where the torque pulse from the engine is dampened. The torque then flows from the torsional damper assembly 10 to the clutch basket hub 12. The clutch basket hub 12 is connected to the clutch basket 14 via splined teeth 13 and 15 as discussed above. Now that torque is in the clutch basket 14, the transmission control module 604 or driver determines whether torque is going to the odd gears through clutch 100 or to the even gears through clutch 200. As mentioned, an example shift was made from a third gear to a fourth gear where clutch 200 closed and clutch 100 opened. Therefore, torque goes from the clutch basket 14, through the spline teeth 15 in the clutch basket to the spline teeth 213 in the reaction plate 212. With clutch 200 closed, torque is transmitted from the reaction plates 212 to the friction plates 214. Power flows from the body of the friction plate 214 through the friction plate splines 215 to the inner clutch basket 210 via inner clutch basket splines 254. Torque then flows from inner clutch basket 210 through splines 256 to the mating splines 224 on the outer transmission shaft 24. Once torque is in this shaft 24 it flows to the rest of the transmission via outer transmission shaft gear 26. Throughout this process, clutch 100 is open and is not transmitting any meaningful power.

Figure 4G:
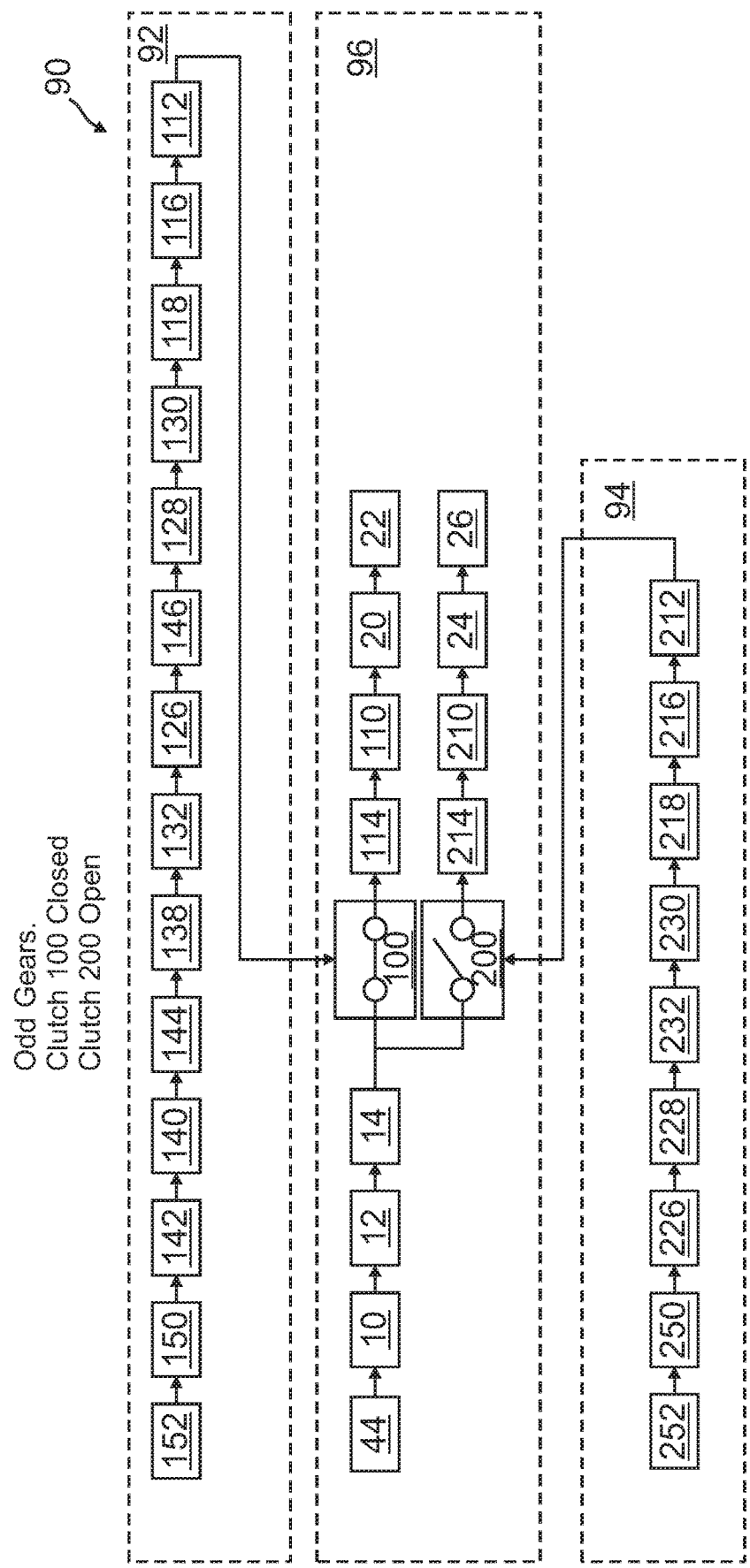
FIG. 4G is a control and torque flow in an odd gear configuration diagram of an exemplary embodiment.

FIG. 4G illustrates a control and torque flow in an odd gear configuration diagram 90. In particular, FIG. 4G illustrates a first control flow 92 for the first clutch 100, a second control flow 94 for the second clutch and the torque flow 96 through the dual clutch 300 in an odd gear configuration mode. A description of the control and torque flow is provided in view of FIG. 4G and FIGS. 2 through 4G. The first engaging clutch 100 is activated in the following manner in an embodiment. The transmission control module 604 or driver sends a signal to the linear actuator 152 to engage clutch 100. The linear actuator 152 starts extending and pushes shift lever 150. Shift lever 150 is affixed to a case in such a manner that is affixed to the case in such a way that it is constrained in x, y, z but is allowed to pivot about the two pivot arms 153 of the shift lever 150. As the linear actuator 152 extends, the shift lever 150 pivots pushing the middle bearing slide 142 towards clutch 100. Since, the anti-friction element 148 is positioned between the middle bearing slide 142 and the outer transmission shaft 24, the middle bearing slide 142 is allowed to move with minimal friction relative to the outer transmission shaft 24 that is spinning. A needle bearing, bushing or something similar could be used in place of this anti-friction element 148. It may also be possible to run without an anti-friction element 148 in this location. This axial movement is continued through bearing 140 to bearing holder 138. Retaining ring 144 constrains bearing 140 to the bearing holder 138 to transfer the axial movement initiated by actuator 152. Bearing holder 138 pushes against a series of push rods 132. In one embodiment, four push rods 132 are used, however in other embodiments more or less push rods are used as long as the axial movement initiated by actuator 152 can get from one side of inner clutch basket 210 to the other side. In addition, there are numerous ways that this axial movement initiated by actuator 152 may be transmitted from one side of inner clutch basket 210 to the other side. These push rods 132 slide through anti-friction elements 134 in inner clutch basket 210. Inner clutch basket 210 is connected to outer transmission shaft 24. This pushrod 132 then pushes against bearing holder 126. Bearing holder 126 transmits axial movement and force to bearing 128 and then into spring slide 130. The retaining ring 146 holds the bearing 128 to the bearing holder 126. The anti-friction element 136 allows the spring slide 130 to move axially with minimal friction relative to the inner transmission shaft 20. A needle bearing, bushing or something similar could be used in place of this anti-friction element 136. Moreover, it may be possible to run without an anti-friction element 136. The spring slide 130 pushes against the first diaphragm biasing member 118. In this layout, a spring diaphragm biasing member 118 is shown. Many types of biasing members common in the industry could be used such as a wave spring, a Belleville spring, a coil spring, a series of coil springs etc. As this the first diaphragm biasing member 118 compresses, force is transmitted from the linear actuator 152 through the system just described to the pressure plate 116. Manipulation of the clamp up characteristic of the clutch by changing spring loads, changing the rate of load from the linear actuator, slowly move the actuator to a point where the clutches are all touching but only transmitting a small amount of power before fully activating, and allowing fine tuning of how much force is being applied to the clutch thereby allowing it to slip at overload torques, allowing modulation of the clutch so dynamic friction is maintained and not hit full lock up etc. As the linear actuator 152 continues to move axially, a linear or axial force delivered to the pressure plate 116 by the first diaphragm biasing member 118 increases and engages the clutch 100. The force delivered to the pressure plate 116 by biasing member 118 engages clutch 100 by applying a force between reaction plates 112 and friction plates 114. This force is resisted by the inner clutch basket 110. Once a high enough force is applied to these reaction plates 112 and friction plates 114, torque is transferred from the clutch basket 14 to the inner clutch basket 110 via reaction plates 112 and friction plates 114. From the inner clutch basket 110 torque is transmitted to the inner transmission shaft 20 via splines 156 on the inner clutch basket 110 and mating splines 21 on the inner transmission shaft 20. This torque is delivered to the rest of the transmission via gears 26 on the inner transmission shaft 20. Once clutch 100 is engaged, torque flows as shown in FIG. 4G. In particular, torque flows from the engine 44, to the torque compensator 10, to the clutch basket hub 12, to the clutch basket 14, through clutch 100 like just described, to the inner transmission shaft 20, to inner transmission shaft gears 22 and then to the rest of the drivetrain. During shifting from clutch 200, even gears, to clutch 100, odd gears, clutch 200 is disengaging as clutch 100 is engaging and a smooth handoff from clutch 200 to 100 occurs during that time.

Figure 5:
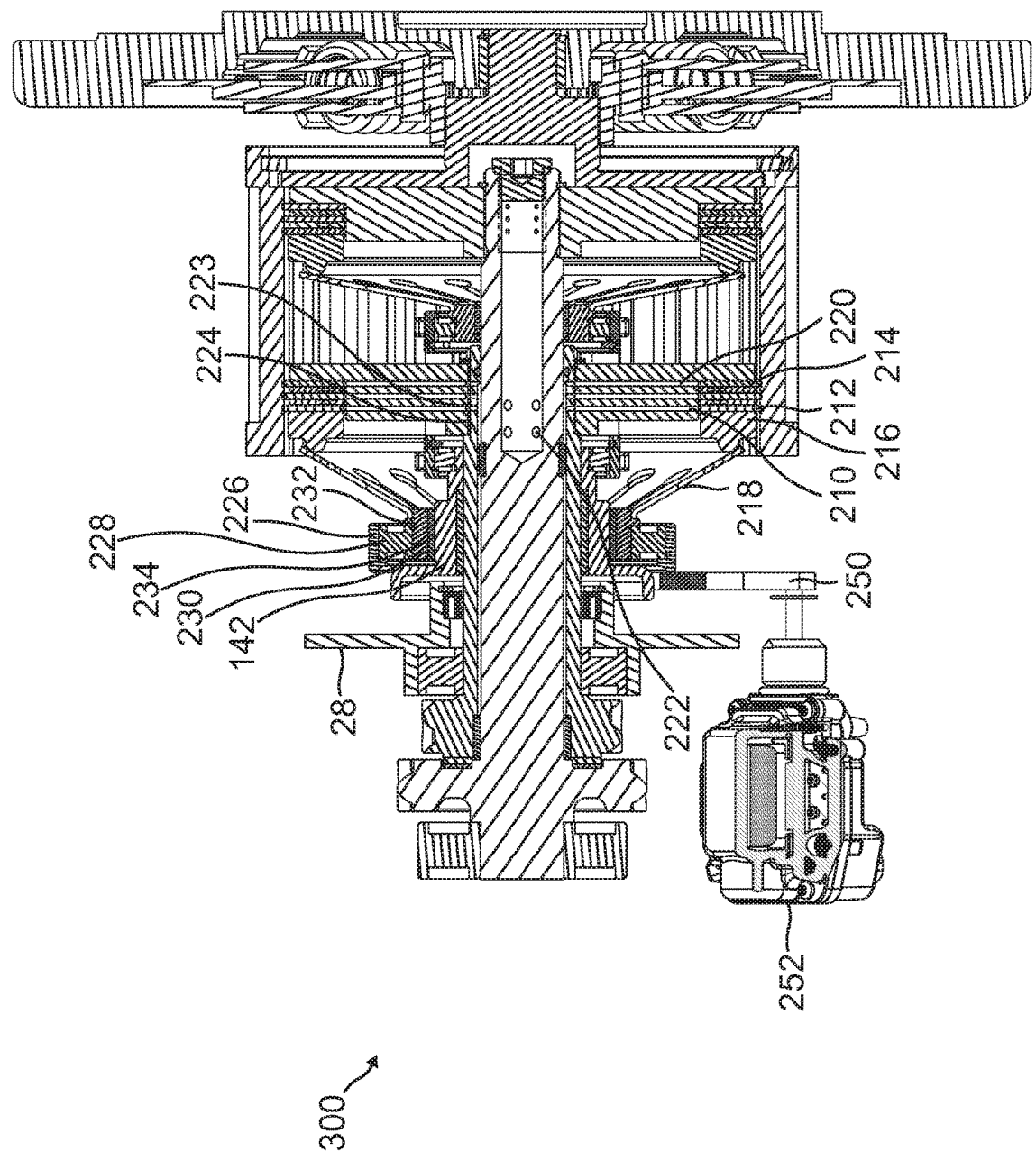
FIG. 5 is a cross-section second side view of the dual clutch of FIG. 3 illustrating the second actuator and second shift lever.
Figure 5G:
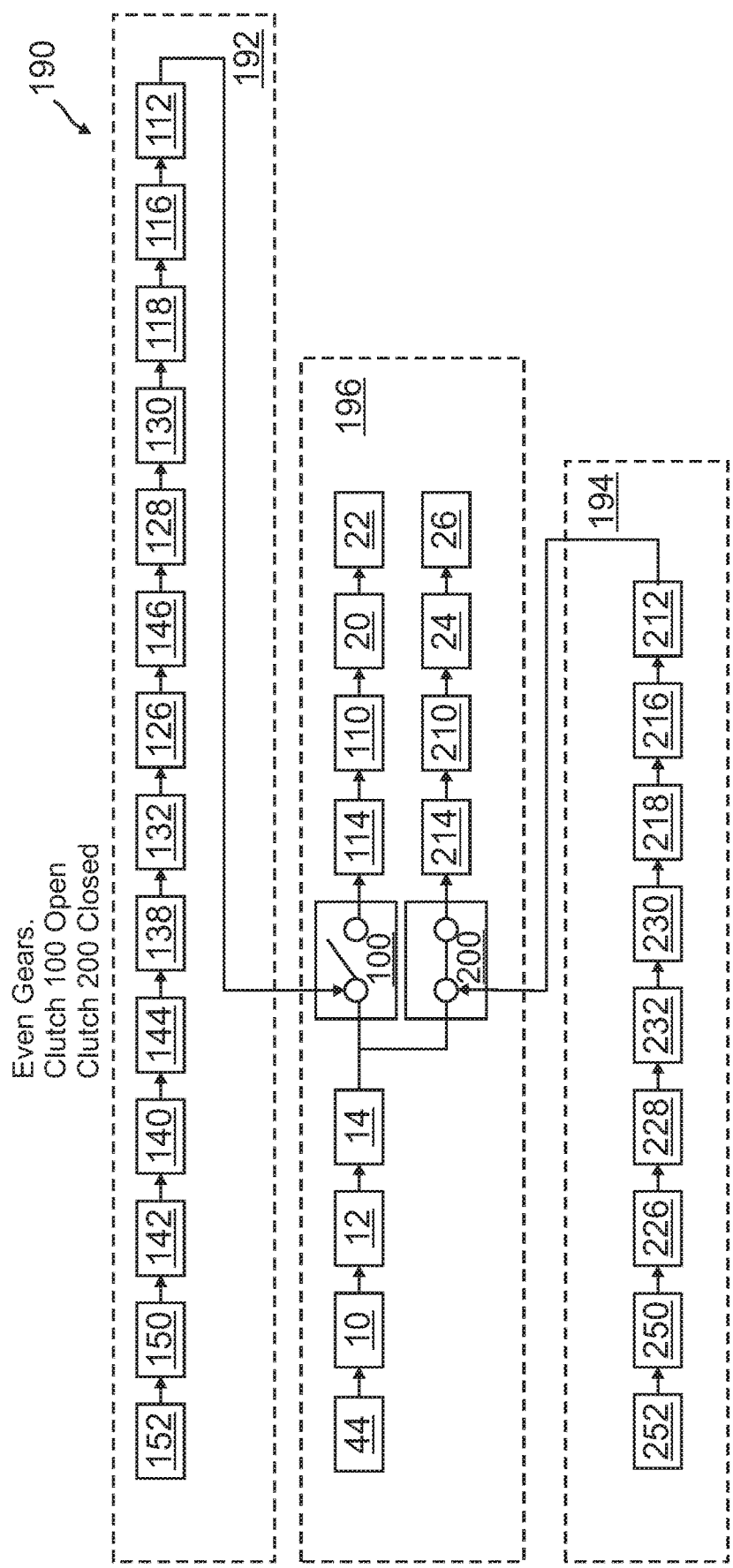
FIG. 5G is a control and torque flow in an even gear configuration diagram of an exemplary embodiment.

Operation of the second clutch is here forth described in view of FIG. 5 through 5G. FIG. 5 is a cross-section second side view of the dual clutch 300. FIG. 5 illustrates the second actuator 252 and the second shift lever 250 used to manipulate the second clutch 200. FIG. 5A illustrates the clutch basket 14. FIG. 5B illustrates a reaction plate 212 including outer spline teeth 213 to engage the inner splines 15 of the clutch basket 14. FIG. 5C is illustration of a friction plate 214 having inner spline teeth 215 that engage spline teeth 254 of the second inner clutch basket 210 illustrated in FIG. 5E. The clutch basket 210 also includes inner splines 256 that engage splines 224 on the outer transmission shaft 24 as discussed above. FIG. 5D illustrates the clutch basket hub 12 and the outer splines 13 that engage the inner splines 15 of the clutch basket 14 as also discussed above. FIG. 5F illustrates the second shift lever 250. The second shift lever 250 includes pivot arms 254. FIG. 5G is a control and torque flow diagram 190 in an even gear configuration diagram of an exemplary embodiment. In particular, FIG. 5G illustrates a first control flow 192 for the first clutch 100, a second control flow 194 for the second clutch and the torque flow 196 through the dual clutch 300 in an even gear configuration mode.

In engaging clutch 200, the transmission control module 604 or driver sends a signal to the linear actuator 252 to engage clutch 200. The linear actuator 252 starts extending and pushes shift lever 250. Shift lever 250 is affixed to the case in such a way that it is constrained in x, y, z but is allowed to pivot about pivot arms 254. As the linear actuator 252 extends, the shift lever 250 pivots pushing bearing holder 226 which in turn pushes bearing 228 which in turn pushes against shoulder 232 on spring slide 230. The anti-friction element 234 positioned between the spring slide 230 and the middle bearing slide 142 allows the spring slide 230 to move with minimal friction relative to the middle bearing slide 142. A needle bearing, bushing or something similar may be used in place of this anti-friction element 234. Moreover, it may also be possible to run without an anti-friction element 234 in this location. The spring slide 230 pushes against the second diaphragm biasing member 218. In this layout, a diaphragm spring 218 is used. Many types of biasing members common in the industry could be used such as a wave spring, a Belleville spring, a coil spring(s), a coil spring assembly etc. As this biasing member 218 compresses, force is transmitted from the linear actuator 252 through the system just described to the pressure plate 216. As the linear actuator 252 continues to move axially, the force delivered to the pressure plate 216 by spring 218 increases and engages the clutch 200. The force delivered to the pressure plate 216 by biasing member 218 engages clutch 200 by applying a force between reaction plates 212 and friction plates 214. This force is resisted by the inner clutch basket 210. Once a high enough force is applied to these reaction plates 212 and friction plates 214, torque is transferred from the clutch basket 14 to the inner clutch basket 210 via reaction plates 212 and friction plates 214. From the inner clutch basket 210 torque is transmitted to the outer transmission shaft 24 via splines 256 on the inner clutch basket 210 and mating splines 224 on the outer transmission shaft 24. This torque is delivered to the rest of the transmission via gears 26 on the outer transmission shaft 24. The torque path is illustrated in FIG. 5G. Once clutch 200 is engaged, torque flows as illustrated in FIG. 5G. In particular, torque flows from the engine 44, to the torque compensator 10, to the clutch basket hub 12, to the clutch basket 14, through clutch 200 like just described, to the outer transmission shaft 24, to outer transmission shaft gears 26 and then to the rest of the drivetrain. During shifting from clutch 100, odd gears, to clutch 200, even gears, clutch 100 is disengaging as clutch 200 is engaging and a smooth handoff from clutch 200 to 100 occurs during that time.

Figure 6:
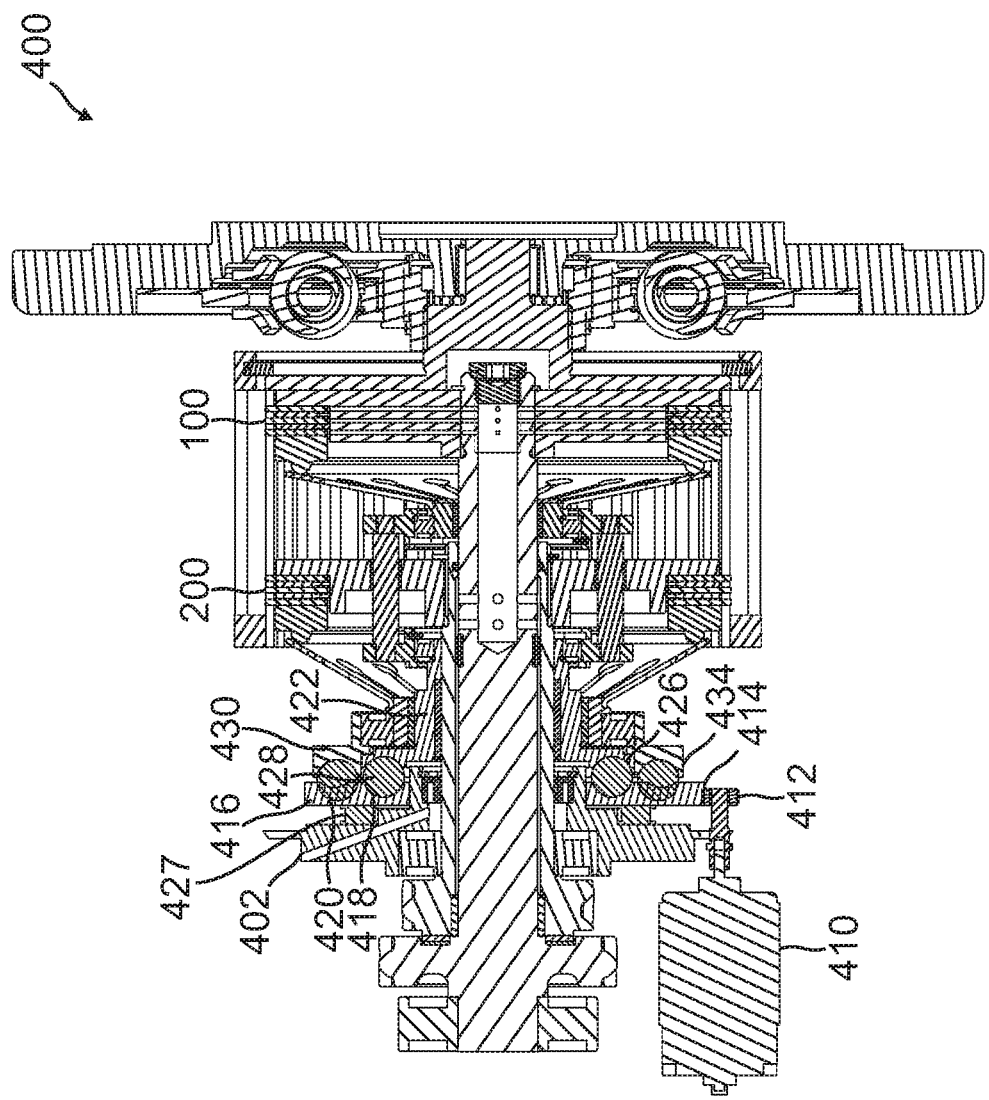
FIG. 6 is a cross-sectional view of a dual clutch of another exemplary embodiment.
Figure 6A:
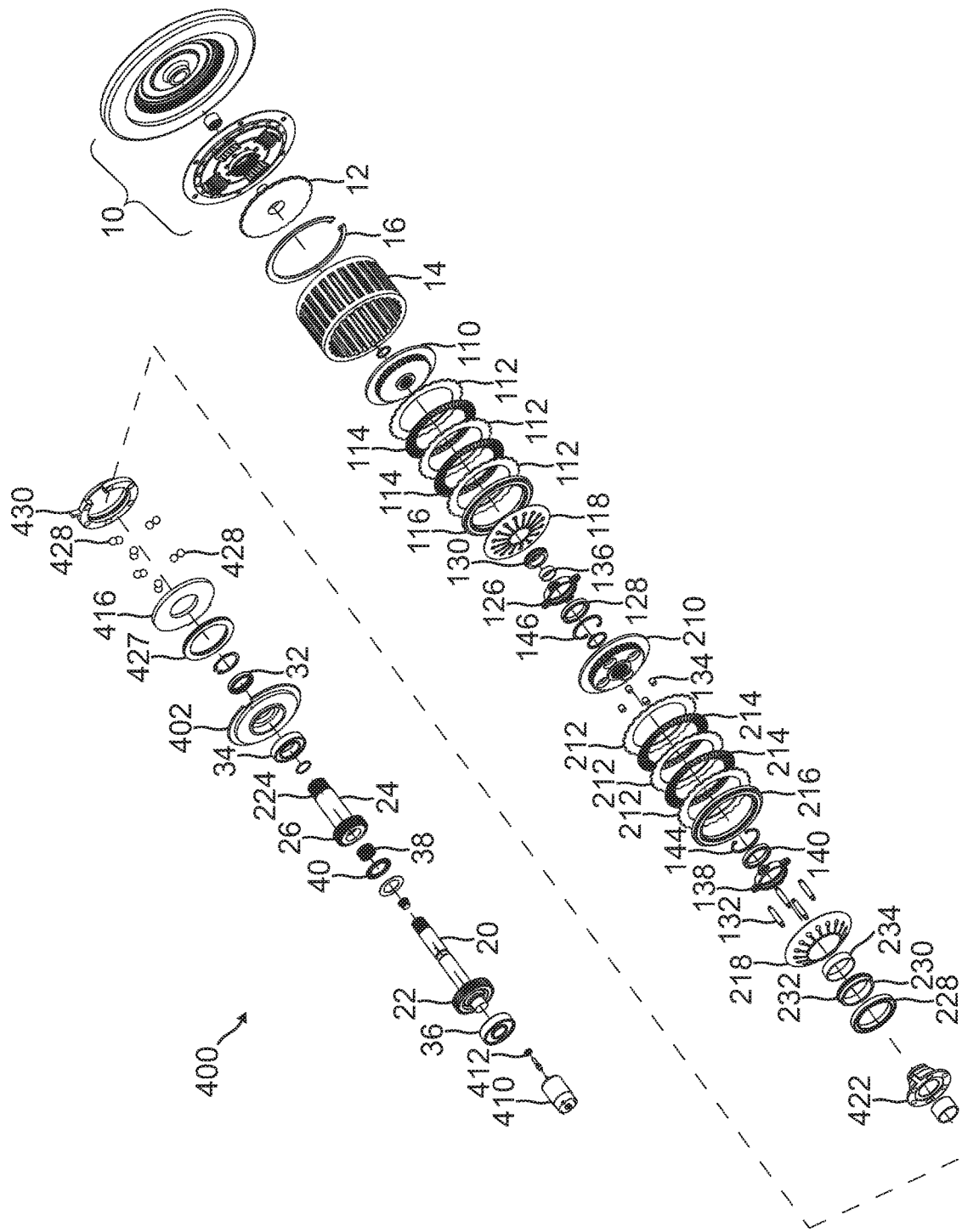
FIG. 6A illustrates an exploded view of the dual clutch of FIG. 6.

In lubricating and cooling embodiments of the dual clutch 300, oil is pulled from a sump or reservoir by a pump (not illustrated) and moved throughout the transmission until it gets to a case lubrication hole 30 (best illustrated in FIG. 3) where the fluid goes through the case 28 and into a chamber 29 between a bearing 34 and a seal 32. Once in this chamber 29, some oil can go between the shaft 24 and the bearing 34 or between the bearing 34 and the case 28. Most of the oil will flow through shaft lubrication holes (not shown) drilled through the shaft 24. Oil is then in a cavity between the inner transmission shaft 20 and outer transmission shaft 24. A transmission seal could be put between these shafts 20 and 24 and bearing 38 or clearances could be tightly controlled between the two shafts 20 and 24 to limit how much oil passes through to lubricate bearings 38 and 40. Most of the oil will flow down cavity between shaft 20 and shaft 24 and towards the end of outer transmission shaft 24 where some oil will flow through the shaft lubrication holes 223 and into the inner clutch basket holes 220 and then flow through the reaction plates 212 and friction plates 214 (as best illustrated in FIG. 5) and out through holes or slots 50 of the clutch basket 14 (as best illustrated in FIG. 4A). What is shown is slots but holes or a combination of slots would also be acceptable. The remainder of the oil flows through shaft lubrication holes 222, 124 to a hollow portion of inner transmission shaft 20. Oil exits inner transmission shaft 20 through lubrication holes 122, 124 (illustrated in FIG. 3). Oil then flows through lubrication holes 120, 124 in the inner clutch basket 110 and then flows through the reaction plates 112 and friction plates 114 and out through holes or slots 50 of the clutch basket 14. What is shown is slots but holes or a combination of slots would also be acceptable as discussed above Another embodiment of a dual clutch 400 is illustrated in FIGS. 6 and 6A. In this embodiment a ball ramp assembly is used to manipulate the first and second clutches 100 and 200 is implemented. FIG. 6 illustrates a cross-sectional view of the dual clutch 400 and FIG. 6A illustrates an exploded view of the dual clutch 400. This embodiment uses many of the same components of the dual clutch 300 of FIG. 3. The different components include a middle bearing slide 422, balls 428, a ball ramp body 416 having gear teeth 414, thrust bearing 427, transmission case 402, pinion gear 412 and electric machine 410. FIGS. 6B through 6E illustrates components of the ball ramp assembly of the dual clutch 400. In particular, FIG. 6C illustrates the ramp body 416 including the gear teeth 414 radially extending from a portion of a perimeter edge of the ramp body 416. The ramp body 416 is further shown as including first and second ball ramps (cam ramps) 418 and 420 that receive a portion of the balls 428. The ball ramps 418 and 420 are grooves having select cam profiles discussed in detail below. The first ball ramp 418 is associated with manipulating the first clutch 100 and the second ball ramp 420 is associated with manipulating the second clutch 200. FIG. 6D illustrates the bearing carrier 430. The bearing carrier 430 is illustrated as including a spring slide window 436 which is a cutout portion along a select portion of a perimeter of the bearing carrier 430. The bearing carrier 430 further includes a bearing carrier anti-rotation member 432 which is a protrusion that extends out from the perimeter of the bearing carrier 430 at a select location. The bearing carrier 430 further includes a plurality of bearing carrier ball pockets 434 to receive a portion of some of the balls 428. FIG. 6E illustrates the middle bearing slide 422. The middle bearing slide 422 includes a middle bearing slide anti-rotation member 424. The middle bearing slide fork 424 extends from a perimeter edge of middle bearing slide 422. The middle bearing slide 422 includes a plurality of middle bearing slide ball pockets 426 that receive a portion of some of the balls 428. When assembled, balls 428 received in the first ball ramp 418 of the ball ramp body 416 are also received in the middle bearing slide ball pockets 426 of the middle bearing slide 422. Moreover, balls 428 received with the second ball ramp 420 of the ball ramp body 416 are also partially received in the bearing carrier ball pockets 434 of the bearing carrier 430. Moreover, referring to the partial assembled view of the dual clutch 400 of FIG. 6B, the middle bearing slide anti-rotation member 424 of the middle bearing slide 422 extends through the bearing carrier window 436 of the bearing carrier 430.

Referring back to FIG. 6, engaging the first clutch 100 is done in the following manner via the electric machine 410 and the ball ramp assembly that includes the ball ramp body 416 with the two separate ball ramps 418 and 420 machined into it. The transmission control module 604 or driver sends a signal to the electric machine 410 to engage the first clutch 100. The electric machine 410 starts turning and thereby turns a gear train that includes pinon gear 412. The pinion gear 412 engages the driving gear teeth 414 on the ball ramp body 416. Other methods could be used here including but not limited to a gear cluster between pinion gear 412 and the gear teeth 414 on the ball ramp body 416. This gear cluster could be a planetary gear set, worm gear, spur gear cluster or any gear or sprocket set that takes a reduction from the electric machine 410 to the ball ramp body 416 thereby rotating the ball ramp body 416 about its axis and relative to the rest of the transmission. FIG. 6F shows the power flow of activating the ball ramp assembly when in odd gears via electric machine 410. In particular, FIG. 6F is a control and torque flow diagram 260 in an odd gear configuration diagram of an exemplary embodiment. FIG. 6F illustrates a first control flow 262 for the first clutch 100, a second control flow 264 for the second clutch and the torque flow 266 through the dual clutch 400 in an odd gear configuration mode.

The middle bearing slide 422 is rotationally constrained by the middle bearing slide anti-rotation member 424 that gets constrained from rotation by the case or another fixed member in the transmission assembly. Because the middle bearing slide 422 is nested inside the bearing carrier 430, the window 436 in the bearing carrier 430 is used so the middle bearing slide anti-rotation member 424 can be constrained by the case or something fixed in the transmission assembly. As discussed above, the middle bearing slide 422 also has ball pockets 426 that contain balls 428. Although six ball pockets 426 are shown in the middle bearing slide 422, any number of ball and ball ramp combinations may be used. Also the ball ramps 418 and 420 on the ball ramp body 416 with the pockets 426 in the middle bearing slide 422 are shown but the pockets and ramps can be on opposite parts. In addition, there could be ball ramps in both the ball ramp body 416 and the middle bearing slide 422. With the middle bearing slide 422 constrained rotationally but not axially and thereby the balls 428 due to the ball pockets 426, as the ball ramp body 416 rotates relative to the assembly it also rotates relative to middle bearing slide 422. As ball ramp body 416 rotates, the ball 428, which is constrained rotationally but not axially, starts to move from position 438 on the ball ramp 418 towards the transition zone 448 and then starts to move up the engaged ramp portion 440. As it moves up the engaged ramp portion 440, middle bearing slide 422 starts to move axially as well. Although the description is discussed using ball ramps, cam ramps where cam ramps are on the ball ramp body 426 as well as on the middle bearing slide 422 with no ball 428 between them could also be used. Any cam and follower mechanism that acts as described would also work. As middle bearing slide 422 starts to move axially it starts engaging clutch 100 as described earlier by pushing on bearing 140 which pushes through retaining ring 144 to bearing holder 138 which pushes on push rods 132 which push on bearing holder 126 which pushes on retaining ring 146 which pushes on bearing 128 which pushes on spring slide 130 which pushes on spring 118 which pushes on pressure plates 116 which pushes on reaction plate 112 which when enough force is applied works with friction plates 114 to deliver torque from the clutch basket 14 to the inner clutch basket 110 which delivers torque to inner transmission shaft 20 then to inner transmission shaft gear 22 and then to the rest of the transmission.

Engaging clutch 200 in FIG. 6 is done in the following manner via an actuator such as, not limited to, an electric machine 410 and a ball ramp body 416 with 2 separate ball ramps 418 and 420 machined into it. The transmission control module 604 or driver sends a signal to the electric machine 410 to engage clutch 200. The electric machine 410 starts turning and thereby turns a gear train. In this case, pinion gear 412 is shown driving gear teeth 414 on the ball ramp body 416.

As discussed above, there are multiple way of activating the clutches 100 and 200 beyond the use of an electric machine 410 and pinion gear arrangement 412. An example, of an alternative activation system 460 is illustrated in the control and torque flow diagram 260 in the odd gear configuration diagram of FIG. 6F. The activation system 460 may be multiple things that rotate the ball ramp body 416 of the ball ramp assembly including, but not limited to, a linear actuator pushing on a portion of the ball ramp body 416. This could push on a lever or any portion of the ball ramp body 416 that would create a rotary motion. The actuator may be mechanically, electrically or hydraulically powered. Other activation systems may include a slave cylinder pushing on a lever or other portion of the ball ramp body 416. Another activation system 460 could be an electric machine with a worm gear on it driving a mating gear on the ball ramp body 416. Moreover, rotation of the ball ramp body 416 could also be done via a lever on the ball ramp body 460 with a linear actuator pushing on it, a spur gear cluster, any gear sprocket set that takes a reduction from the electric machine to the ball ramp body 416 thereby rotating the ball ramp body 416 about its axis and relative to the rest of the transmission or numerous other methods. Hence, numerous methods of rotating the ball ramp body 416 are contemplated.

Figure 6G:
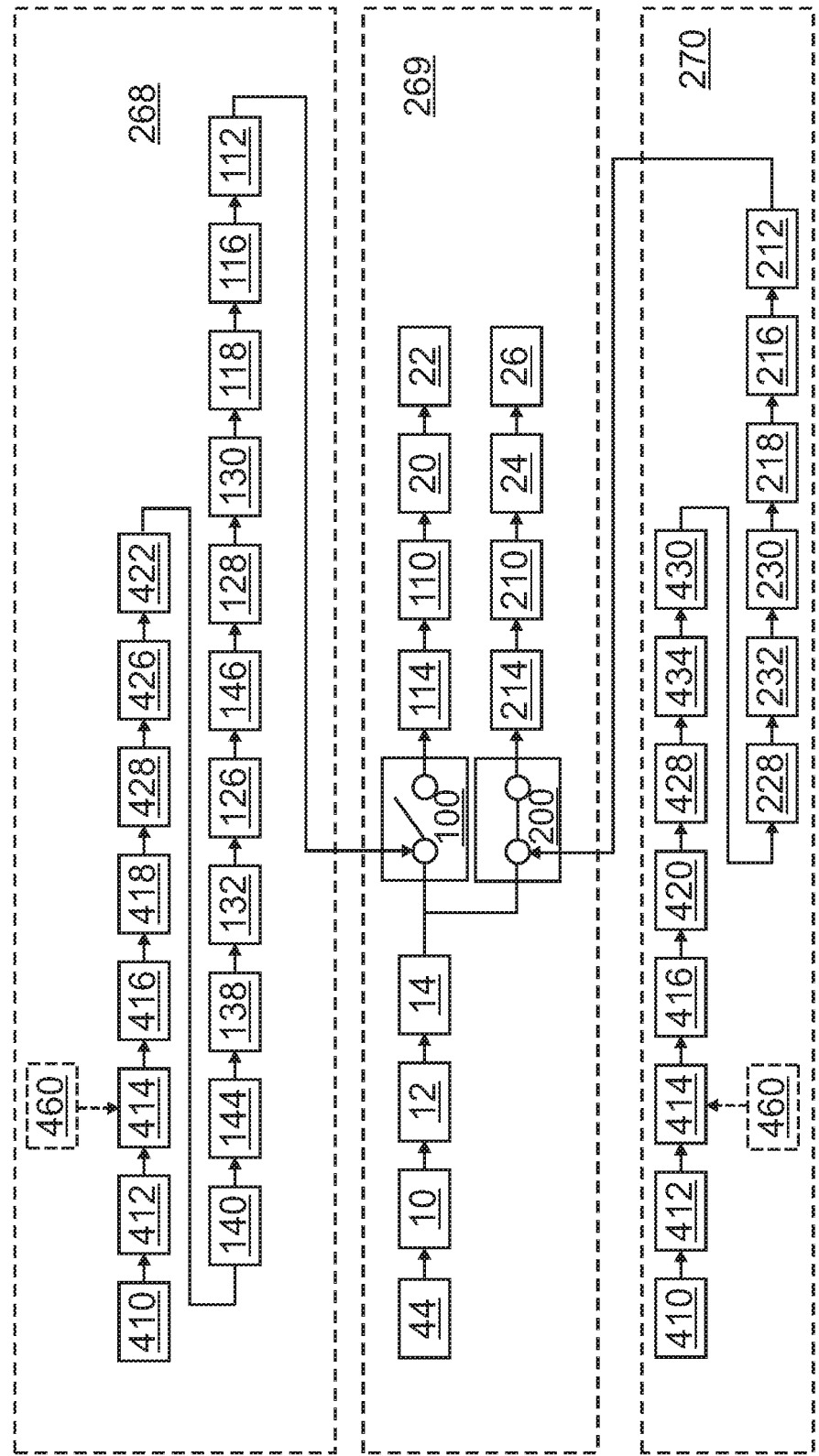
FIG. 6G illustrates a control and torque flow diagram in an even gear configuration diagram of an exemplary embodiment.

FIG. 6G illustrates the power flow of activating the ball ramp assembly when in even gears via electric machine 410. In particular, FIG. 6G is a control and torque flow diagram 267 in an even gear configuration diagram of an exemplary embodiment. FIG. 6G illustrates a first control flow 268 for the first clutch 100, a second control flow 270 for the second clutch 200 and the torque flow 269 through the dual clutch 400 in an even gear configuration mode. The bearing carrier 430 is rotationally constrained by a spring slide fork 432 that gets constrained from rotation by the case or another fixed member in the transmission assembly. Bearing carrier 430 also has ball pockets 434 that contain balls 428. Although, six ball pockets 434 in the bearing carrier 430 are shown, any number of ball and ball ramp combinations may be used. Also shown are ball ramps 418 and 420 on the ball ramp body 416 with the ball pockets 434 in the bearing carrier 430. However, in other embodiments the pockets and ramps can be on opposite parts. In addition, there could be ball ramps in both the ball ramp body 416 and the bearing carrier 430. With the bearing carrier 430 constrained rotationally but not axially and thereby the balls 428 due to the ball pockets 430, as the ball ramp body 416 rotates relative to the assembly it also rotates relative to bearing carrier 430. As ball ramp body 416 rotates, the balls 428, which are constrained rotationally but not axially, start to move from position 442 on the ball ramp 420 towards the transition zone 448 and then starts to move up the engaged ramp portion 446. As it moves up the engaged ramp portion 446, bearing carrier 430 starts to move axially as well. The description was done using ball ramps but cam ramps where cam ramps are on the ball ramp body 416 as well as on the bearing carrier 430 with no balls 428 between them may also be used. Any cam and follower mechanism that acts as described would also work. As bearing carrier 430 starts to move axially it starts engaging clutch 200 as described earlier by pushing on bearing 228 which pushes on spring slide shoulder 232 which pushes on spring slide 230 which pushes on spring 218 which pushes on pressure plate 216 which pushes on reaction plates 212 which when enough force is applied works with friction plates 214 to deliver torque from the clutch basket 14 to the inner clutch basket 210 which delivers torque to outer transmission shaft 24 then to outer transmission shaft gear 26 and then to the rest of the transmission.

As discussed above, there are multiple way of activating the clutches 100 and 200 beyond the use of an electric machine 410 and pinion gear arrangement 412. An example, of an alternative actuator 460 is illustrated in the control and torque flow diagram 267 in an even gear configuration diagram of FIG. 6G. The actuator 460 may be multitude of different devices that rotate the ball ramp body 416 including, but not limited to, a linear actuator pushing on a portion of the ball ramp body 416. This could push on a lever or any portion of the ball ramp body 416 that would create a rotary motion. The actuator may be mechanically, electrically or hydraulically powered. Other actuator systems may include a slave cylinder pushing on a lever or other portion of the ball ramp body 416. Another actuator 460 may be an electric machine with a worm gear on it driving a mating gear on the ball ramp body 416. Moreover, rotation of the ball ramp body 416 could also be done via a lever on the ball ramp body 460 with a linear actuator pushing on it, a spur gear cluster, any gear sprocket set that takes a reduction from the electric machine to the ball ramp body 416 thereby rotating the ball ramp body 416 about its axis and relative to the rest of the transmission or numerous other methods. Hence, numerous methods of rotating the ball ramp body 416 are contemplated with numerous different type of actuators.

Figure 6I:
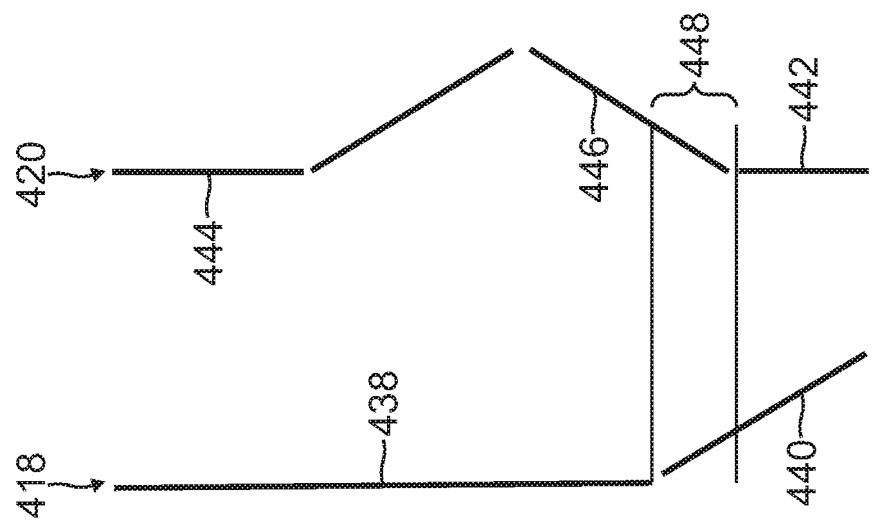
FIG. 6I illustrates ball ramp profiles with neutral of ball ramps of an exemplary embodiment.
Figure 6H:
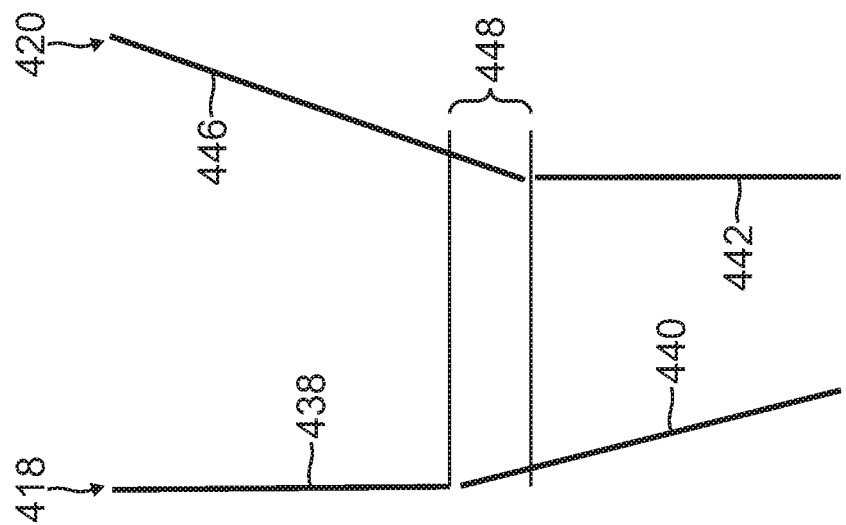
FIG. 6H illustrates ball ramp profiles of ball ramps of an exemplary embodiment.

Referring to FIGS. 6H and 6I an illustration of the how the ramps function of the ramp ball assembly is provided in this embodiment. A dual clutch has a handoff section where power is transferred smoothly from clutch 100 to clutch 200 and vice versa. This handoff section can be done many ways if separate actuators are used to control clutch 100 and clutch 200. In the embodiment of FIG. 6, one electric machine 410 controls one ball ramp body 416 that has 2 ball ramps 418 and 420 as part of the main ball ramp body 416. In this case, the handoff from clutch 100 to clutch 200 and vice versa has to be machined or formed into the ball ramps 418 and 420 and is shown as 448. This handoff section 448 will be consistent for every gear change first to second, second to third, third to second etc. This handoff section 448 can be a linear slope as shown or have a different shape between track 418 and 420 depending on the shift feel that is desired. In FIG. 6H, the ball ramp 418 (or cam ramp) is used to control the first clutch 100 and ball ramp 420 is used to control the second clutch 200. Ball ramp profile 438 of the first ball ramp 418 causes the first clutch to be disengaged while ball ramp profile 440 causes the first clutch to be engaged. Ball ramp profile 446 of the second ball ramp 420 causes the second clutch 200 to be engaged while ball ramp profile 442 causes the second clutch to be disengaged. As discussed above, the handoff section 448 of the profiles 440 and 446 seamlessly switches the engagement and disengagement between the first and second clutches 100 and 200. FIG. 6I illustrates the ramps functions with neutral in an embodiment. In this example embodiment, a ball ramp profile 444 is introduced in ball ramp 420. Ball ramp profile 444 causes the second clutch to be disengaged. Since, the ball ramp profile 444 is parallel with a portion of the ball ramp profile 438 of the first ball ramp 418, both clutches 100 and 200 will be disengaged at the same time to accommodate neutral.

The ball ramp body 416 can be held in position or in an engaged position in a number of different ways. These include, but are not limited to, being in a continuous feedback loop where the electric machine 410 is continuously moving or adjusting so the clutches have a limited amount of slip in them, a mechanical locking feature may be used to lock the gear train or ball ramp body 416 to the case, a solenoid engaging a slot or hole in the ball ramp body 416 may be used to lock the ball ramp body 416 to the case, pulse width modulation may be used, a ball detent may be used to hold the ball ramp in an engaged position, an electric coil on the backside of the ball ramp may be used, a brake on the electric machine may be used, a flat on the ball ramps 418 and 420 with a detent machined or formed in may also be used.

Figure 7:
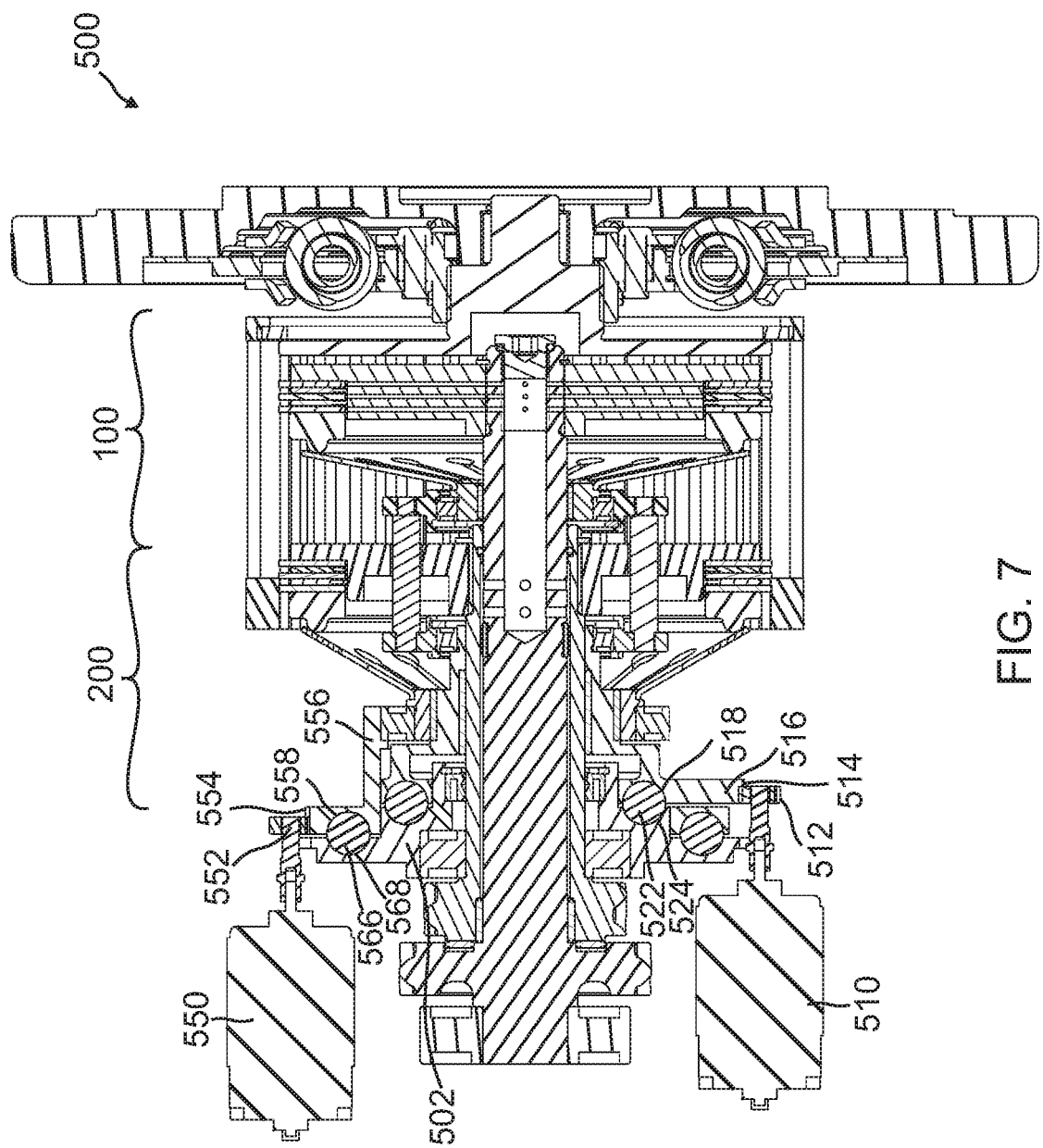
FIG. 7 is a cross-sectional view of a dual clutch of another exemplary embodiment.
Figure 7A:
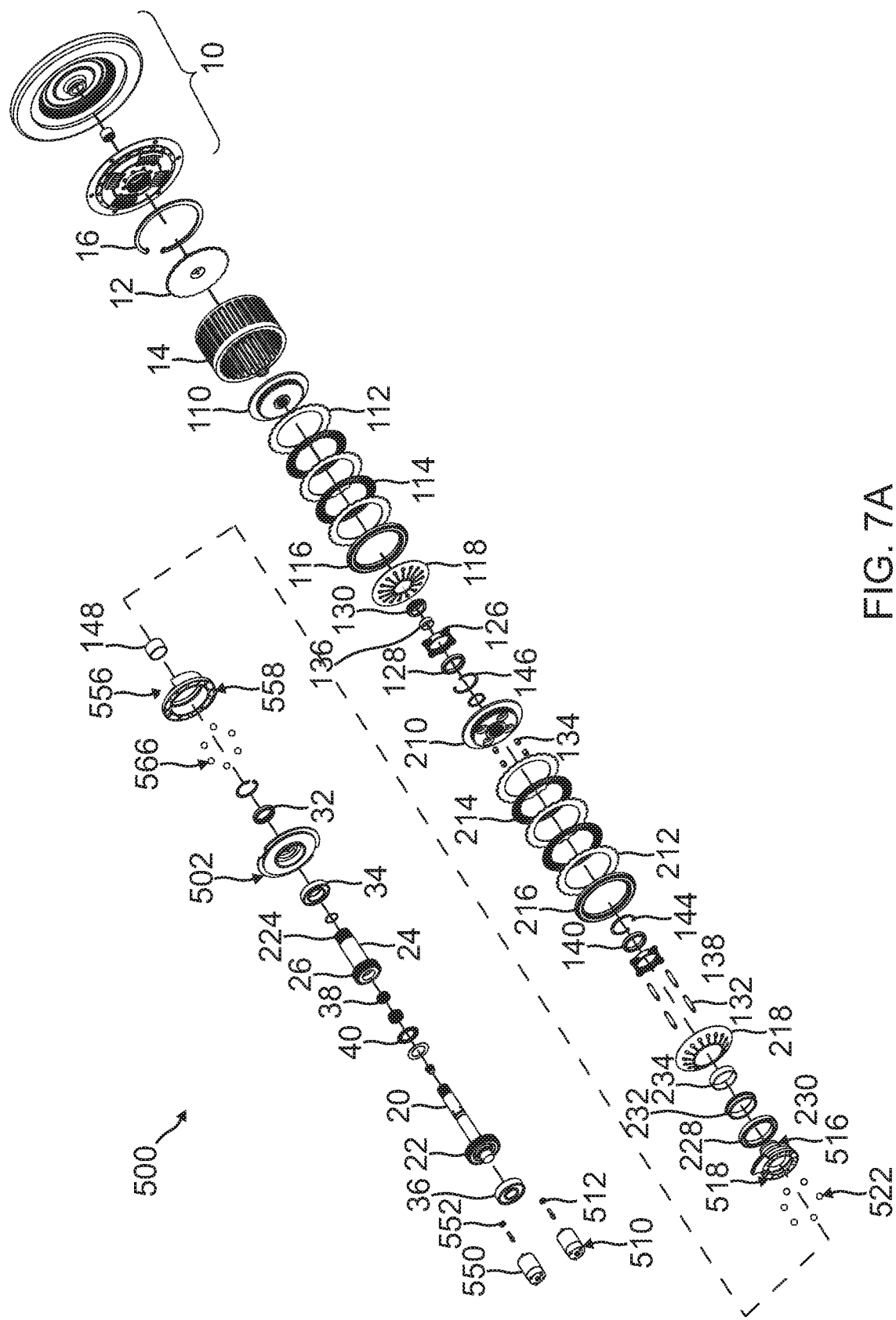
FIG. 7A is an exploded view of the dual clutch of FIG. 7.
Figure 7D:
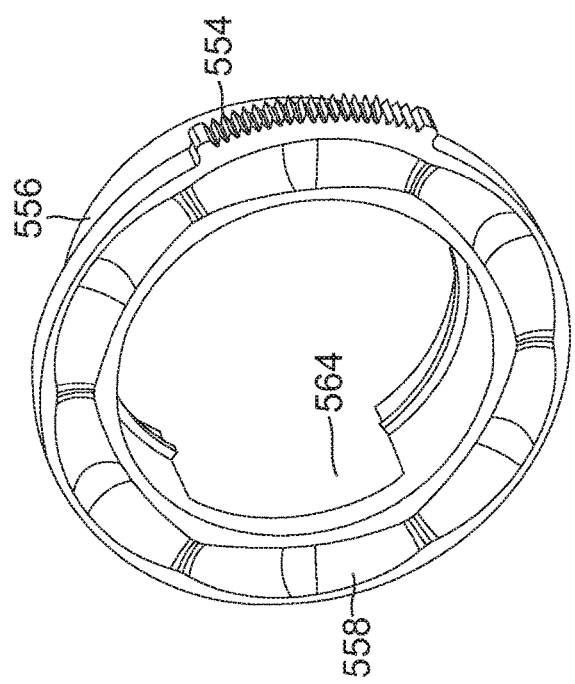
FIG. 7D is a side perspective view of the bearing carrier of an exemplary embodiment.
Figure 7C:
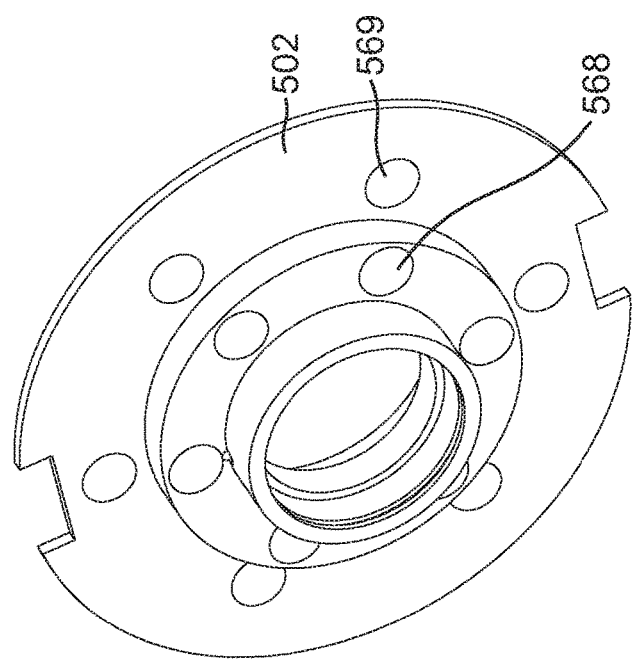
FIG. 7C is a side perspective view of the transmission case of an exemplary embodiment.
Figure 7B:
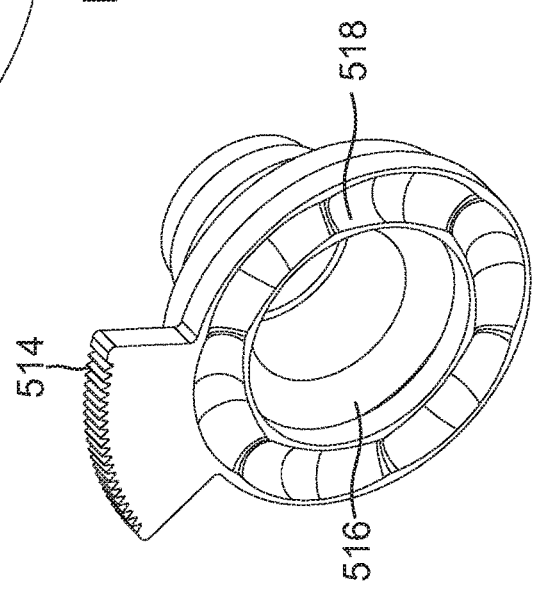
FIG. 7B is a side perspective view of the middle bearing slide of an exemplary embodiment.

Referring to FIG. 7, a cross-sectional view of a dual clutch 500 of another exemplary embodiment is provided. This embodiment employs two separate ball ramps of a ball ramp assembly to engage the first clutch 100. FIG. 7A illustrates an exploded view of the dual clutch 500. Components that are different than the dual clutch assemblies 300 and 400 discussed above include middle bearing slide 516, balls 522, spring slide 556, transmission case 502, pinion 512, electric machine 510, pinion 552 and electric machine 550. Some of the components of the ball ramp assembly are illustrates in FIGS. 7B through 7D. FIG. 7B is a side perspective view of the middle bearing slide 516. The middle bearing slide 516 includes a ball ramp 518 (or cam ramp) and middle bearing slide gear teeth 514. The middle bearing slide gear teeth 514 are on a portion that extends out from a portion of a perimeter of the middle bearing slide 516. FIG. 7C is a side perspective view of the transmission case 502. The transmission case 502 includes a plurality of inner case ball pockets 568 and outer case ball pockets 569. FIG. 7D is a side perspective view of the bearing carrier 556. The bearing carrier 556 includes a bearing carrier ball ramp 558 (cam ramp) and a bearing carrier window 564. The bearing carrier window 564 extending through an edge to a mid-portion of the bearing carrier 556. The bearing carrier 556 further includes bearing carrier gear teeth 554 that generally extend out along an edge portion of a perimeter of the bearing carrier 556. Assembled, the middle bearing slide 516 is received within the bearing carrier 556 such that the portion containing the middle bearing slide gear teeth of the middle bearing slide 516 extends through the bearing carrier window 564 of the bearing carrier 556. Moreover, the ball ramp 518 of the middle bearing slide 516 is aligned with the inner case ball pockets 568 and ball ramp 558 of the bearing carrier 556 are aligned with the outer case ball pockets 569 of the transmission case 502. The polarity of balls 522 are received with the inner and outer case ball pockets 568 and 569 and the ball ramps 518 and 588 of the respective middle bearing slide 516 and bearing carrier 556.

Engaging clutch 100 of the dual clutch 500 is done via actuator such as, but not limited to the electric machine 510 and the middle bearing slide 516 with the ball ramp or cam ramp 518 machined into it. The transmission control module 604 or driver sends a signal to the electric machine 510 to engage clutch 100. The electric machine 510 starts turning and thereby turns a gear train. In this case pinion gear 512 is shown driving gear teeth 514 on the middle bearing slide 516. Other methods could be used here including, but not limited, to a gear cluster between pinion gear 512 and the gear teeth 514 on the middle bearing slide 516. This gear cluster could be a planetary gear set, worm gear, spur gear cluster or any gear or sprocket set that takes a reduction from the electric machine 510 to the middle bearing slide 516 thereby rotating the middle bearing slide 516 about its axis and relative to the rest of the transmission. Rotation of the ball ramp body could also be done via a lever on the ball ramp body with a linear actuator pushing on it or numerous other methods. The middle bearing slide 516 is rotationally constrained to the assembly by the gear teeth 514 which mesh with the gear teeth on pinion 512 which is connected to the electric machine 510 which is constrained by the transmission case 28. Because the middle bearing slide 516 is nested inside the bearing carrier 556, a window 564 has to be in bearing carrier 556 so the gear teeth 514 on the middle bearing slide 516 can mesh with the pinion gear 512. The transmission case 502 has ball pockets 568 that contain balls 522. There can be any number of balls 522 and corresponding pockets 568 and ball ramps 518. The ball ramps 518 are shown on the middle bearing slide 516 with the pockets 568 in the transmission case 502 but the pockets and ramps may be on opposite parts. In addition, there may be ball ramps in both the transmission case 502 and the middle bearing slide 516. With the middle bearing slide 516 constrained rotationally but not axially, as the middle bearing slide 516 rotates relative to the assembly it also rotates relative to transmission case 502. As middle bearing slide 516 rotates the ball ramp 518 and consequently the entire middle bearing slide 516 starts to ride up the ball 522 which is fixed in the transmission case 502. Therefore the middle bearing slide 516 is rotating and translating towards clutch 100. As middle bearing slide 516 starts to move axially it starts engaging clutch 100 as described earlier by pushing on bearing 140 which in turn pushes on bearing holder 138 through retaining ring 144 which in turn pushes on push rods 132 which in turn pushes on bearing holder 126 which in turn pushes on retaining ring 146 which in turn pushes on bearing 128 which in turn pushes on spring slide 130 which in turn pushes on spring 118 which in turn pushes on pressure plates 112 which when enough force is applied works with friction plates 114 to deliver torque from the clutch basket 14 to the inner clutch basket 110 which delivers torque to inner transmission shaft 20 then to inner transmission shaft gear 22 and then to the rest of the transmission.

Figure 7E:
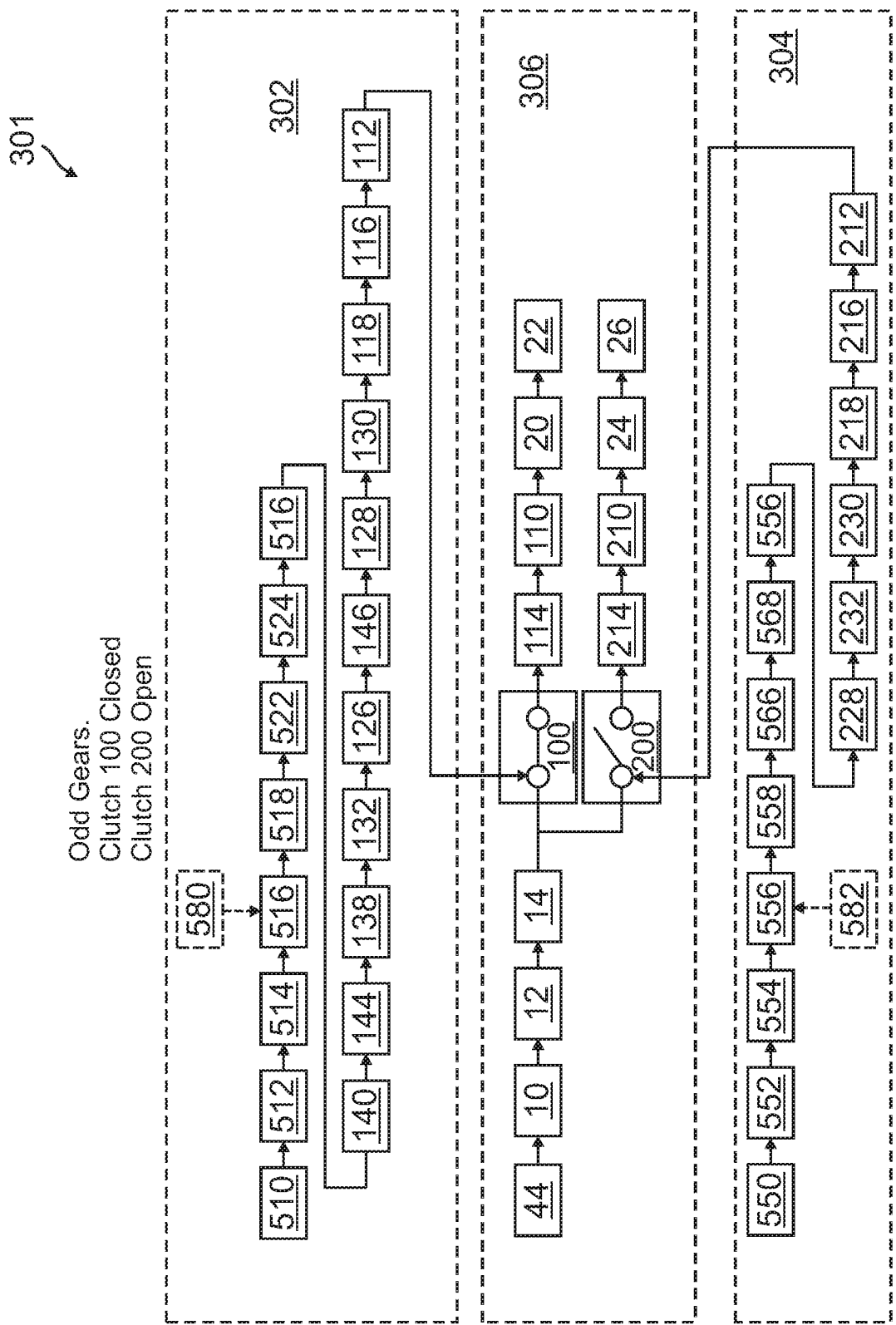
FIG. 7E illustrates a control and torque flow diagram in an odd gear configuration diagram of an exemplary embodiment.

FIG. 7E shows the power flow when in odd gears via electric machine 510. In particular, FIG. 7E is a control and torque flow diagram 301 in an odd gear configuration diagram of an exemplary embodiment. FIG. 7E illustrates a first control flow 302 for the first clutch 100, a second control flow 304 for the second clutch 200 and the torque flow 306 through the dual clutch 400 in an odd gear configuration mode. FIG. 7E illustrates the power flow of activating the ball ramp when in odd gears via electric machine 510.

Engaging clutch 200 in FIG. 7 is done in the following manner via an electric machine 550 and a bearing carrier 556 with a ball ramp or cam ramp 558 machined into it. The transmission control module 604 or driver sends a signal to the electric machine 550 to engage clutch 200. The electric machine 550 starts turning and thereby turns a gear train. In this case, pinion 552 is shown driving gear teeth 554 on the bearing carrier 556. Other methods could be used here including, but not limited to, a gear cluster between pinion 552 and the gear teeth 554 on the bearing carrier 556. This gear cluster could be a planetary gear set, worm gear, spur gear cluster or any gear or sprocket set that takes a reduction from the electric machine 550 to the bearing carrier 556 thereby rotating the bearing carrier 556 about its axis and relative to the rest of the transmission.

Figure 7F:
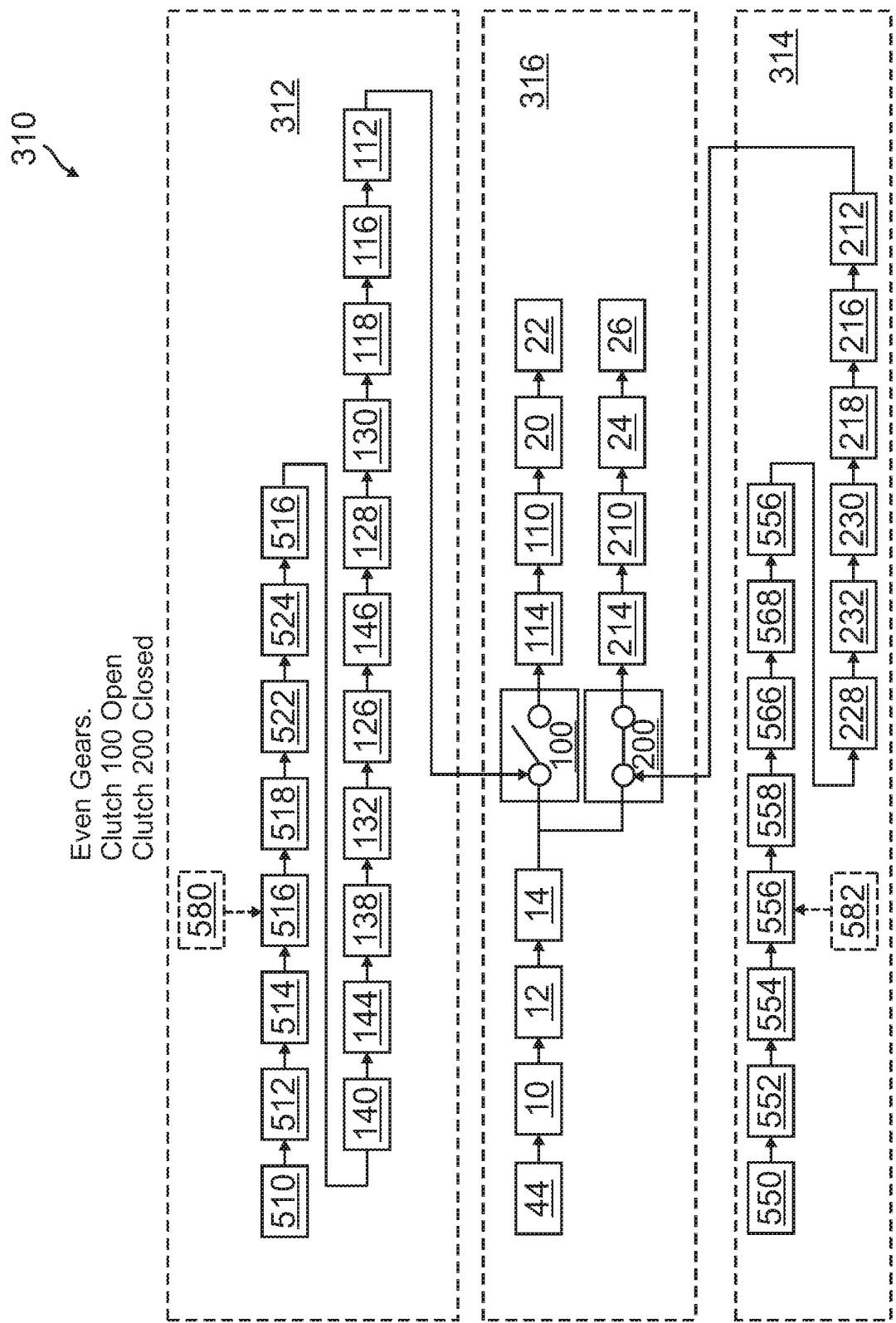
FIG. 7F illustrates a control and torque flow diagram in an even gear configuration diagram of an exemplary embodiment.

FIG. 7F shows the power flow when in even gears via electric machine 510. In particular, FIG. 7F is a control and torque flow diagram 310 in an even gear configuration diagram of an exemplary embodiment. FIG. 7F illustrates a first control flow 312 for the first clutch 100, a second control flow 314 for the second clutch 200 and the torque flow 316 through the dual clutch 400 in an even gear configuration mode. FIG. 7F shows the power flow of activating the ball ramp when in even gears via electric machine 550. Rotation of the ball ramp body of the ball ramp assembly could also be done via a lever on the ball ramp body with a linear actuator pushing on it or numerous other methods. The bearing carrier 556 is rotationally constrained to the assembly by the gear teeth 554 which mesh with the gear teeth on pinion 552 which is connected to the electric machine 510 which is constrained by the transmission case 502. The transmission case 502 has ball pockets 569 that contain balls 566. There can be any number of balls 566 and corresponding pockets 569 and ball ramps 558. The ball ramps 558 are shown on the bearing carrier 556 with the pockets 569 in the transmission case 502 but the pockets and ramps can be on opposite parts. In addition, there could be ball ramps in both the transmission case 502 and the bearing carrier 556. With the bearing carrier 556 constrained rotationally but not axially, as the bearing carrier 556 rotates relative to the assembly it also rotates relative to transmission case 502. As bearing carrier 556 rotates the ball ramp 558 and consequently the entire bearing carrier 556 starts to ride up the balls 566 which are fixed in the transmission case 502. Therefore the spring slide is rotating and translating towards clutch 200. As bearing carrier 556 starts to move axially, it starts engaging clutch 200 as described earlier by pushing on bearing 228 which in turn pushes on spring slide shoulder 232 which in turn pushes on spring slide 230 which in turn pushes on spring 218 which in turn pushes on pressure plate 216 which in turn pushes on reaction plates 212 which when enough force is applied works with friction plates 214 to deliver torque from the clutch basket 14 to the inner clutch basket 210 which delivers torque to outer transmission shaft 24 then to outer transmission shaft gear 26 and then to the rest of the transmission.

There are multiple way of activating the first and second clutches 100 and 200 in the dual clutch 500. Hence, in alternative embodiments an actuator 580 can act on the middle bearing slide 516 and an actuator 582 can act on bearing carrier 556 as illustrated in FIGS. 7E and 7F. Actuator 580 may be multiple things that rotate the middle bearing slide 516 including but not limited to a linear actuator pushing on a portion of the middle bearing slide

516. This actuator 580 could push on a lever or any portion of the middle bearing slide 516 that would create a rotary motion. Other actuators 580 could include a slave cylinder pushing on a lever or other portion of the middle bearing slide 516. Another actuator 580 could be an electric machine with a worm gear on it driving a mating gear on the middle bearing slide 516. As can be seen numerous methods of rotating the ball ramp body or middle bearing slide 516 can be used. Similarly, actuator 582 could be multiple things that rotate the bearing carrier 556 including, but not limited, to a linear actuator pushing on a portion of the bearing carrier 556. This actuator 582 could push on a lever or any portion of the ball ramp that would create a rotary motion. The actuator may be mechanically, electrically or hydraulically powered. Other actuators could include a slave cylinder pushing on a lever or other portion of the bearing carrier 556. Another actuator could be an electric machine with a worm gear on it driving a mating gear on the bearing carrier 556. As can be seen numerous methods of rotating the ball ramp body or bearing carrier 556 can be used.

Referring to FIG. 7G a representation of ball ramps 518 and 558 with ball ramp profiles 538, 540, 546 and 542 of a ball ramp assembly are illustrated. Ball ramp profile 538 of ball ramp 518 causes the first clutch 100 to be disengaged. Ball ramp profile 540 of ball ramp 518 causes the first clutch 100 to be engaged. Ball ramp profile 546 of ball ramp 558 causes the second clutch 200 to be engaged while ball ramp profile 542 of ball ramp 558 causes the second clutch 200 to be disengaged. As previously described, each of these ball ramps are controlled by a different electric machine 510 for ball ramp 518 and 550 for ball ramp 558. Because each of these ball ramps is controlled by a different electric machine they can operate independent of each other. This opens up a number of options including a disconnect between the vehicle engine 44 and the ground by rotating each ball ramp 518 and 558 to their disengaged position so in this case, middle bearing slide 516 would be rotated such that ball ramp 518 was in position 538. At the same time bearing carrier 556 would be rotated such that ball ramp 558 was in position 542. With both clutch 100 and clutch 200 being in disengaged positions, the vehicle motor 44 is disconnected to the ground. To shift from third gear to fourth gear or any odd to even gear, the transmission control module 604 or driver sends a signal to the transmission to engage fourth gear if it isn't already engaged. Additional signals are then sent to both electric machines 510 and 550. Electric machine 550 starts turning which in turn starts ball ramp 558 traveling towards and then up the engaged ramp portion 546 causing bearing carrier 556 to start engaging clutch 200 as described previously. As this is happening electric machine 510 starts ball ramp 518 traveling down engaged ramp portion 540 towards its disengaged ramp portion 538 causing middle bearing side 516 to start disengaging clutch 100 as described previously. The timing of engaging clutch 200 and disengaging clutch 100 can be modified and tuned as each ball ramp mechanism is controlled by a different electric machine. When the shift is complete, clutch 200 is engaged and clutch 100 is disengaged and the transmission is in fourth gear. This logic can be applied for any odd to even shift and reversed for any even to odd shift. Again as described above and shown in FIGS. 7E and 7F different methods can be used to move the middle bearing slide 516 and bearing carrier 556 and their ball ramps 518 and 558.

FIG. 8A illustrates a block diagram of a vehicle 600 of one embodiment implementing the dual clutch 300 described above. The vehicle 600 includes an engine 44 that provides torque to the dual clutch 800. The dual clutch 800 is one of the dual clutch assembles 300, 400 and 500 described above. As described above, the torque is provided to the dual clutch 800 typically via crankshaft connection to the engine 44. This torque is then provided from the dual clutch 800 to a transmission 602 which then provides torque to rear wheels 616*a* and 616*b* via a drive shaft 606 and rear differential 608. The torque is provided to a front differential 612 through a front drive shaft 610 operationally coupled to the transmission 602. Torque is provided to the front wheels 614*a* and 614*b* via the front differential 612. Further illustrated in FIG. 8 is a transmission control module 604. The transmission control unit 604 controls operation of the clutch actuation system as previously described and the transmission gear shifting mechanism in an embodiment. The transmission control unit 604, in one embodiment, includes one or more processing units that implement instructions, such as an algorithm, stored in a memory to cause the transmission to shift and the clutches to open and close during a shift operation of the dual clutch 800.

FIG. 8B illustrates a block diagram of a vehicle 650 of another embodiment implementing the dual clutch 300 described above. The vehicle 650 includes an engine 44 that provides torque to the dual clutch 800. The dual clutch 800 is one of the dual clutch assemblies 300, 400 and 500 discussed above. As described above, the torque is provided to the dual clutch 800 typically via crankshaft connection to the engine. This torque is then provided from the dual clutch 800 to a transaxle 652 which then provides torque to rear wheels 664*a* and 664*b*. The torque is provided to a front differential 658 through a front drive shaft 656 operationally coupled to the transaxle 652. Torque is provided to the front wheels 660*a* and 660*b* via the front differential 658. Further illustrated in FIG. 8B is a transmission control module 604. The transmission control unit 604 controls operation of the clutch actuation system as previously described and the transmission gear shifting mechanism in an embodiment. The transmission control unit 604, in one embodiment, includes one or more processing units that implement instructions, such as an algorithm, stored in a memory to cause the transmission to shift and the clutches to open and close during a shift operation of the dual clutch 800.

Figure 9A:
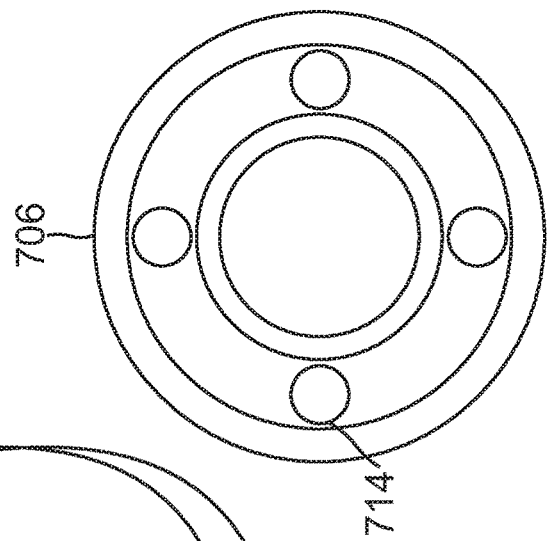
FIG. 9A is a front view of a ball ramp body of an exemplary embodiment.
Figure 9B:
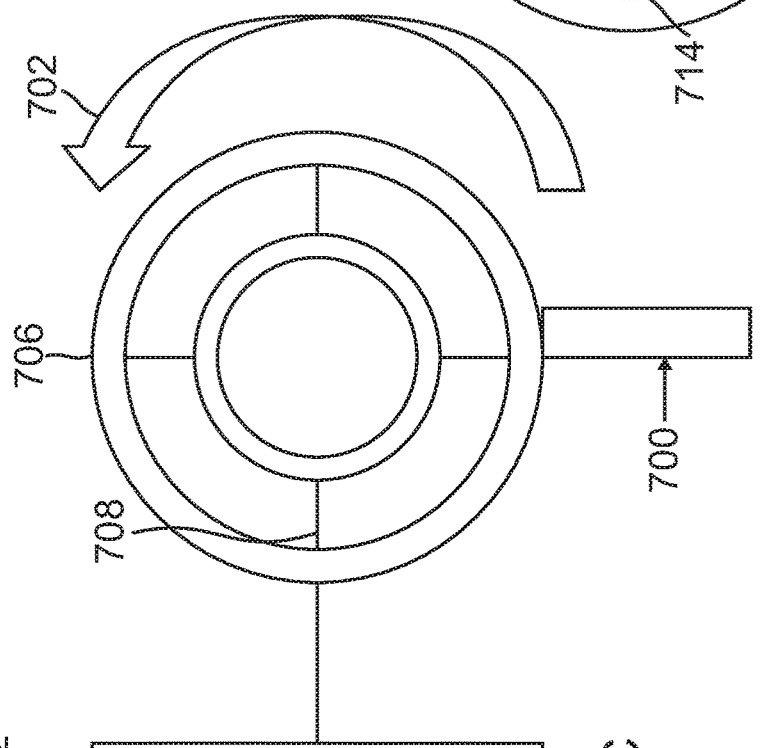
FIG. 9B is an illustration of a rotational movement of the ball ramp body of FIG. 9A.
Figure 9C:
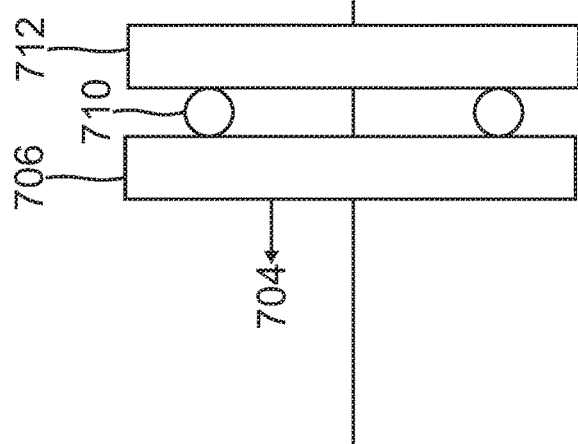
FIG. 9C is a side view illustration of ramp ball assembly generation a linear force with the ball ramp body of FIG. 9A.
Figure 9D:
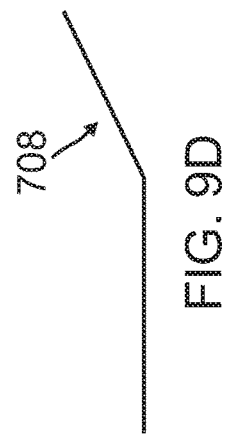
FIG. 9D is an illustration of a ball ramp profile of an exemplary embodiment.

Referring to FIGS. 9A through 9D an illustration of a general ball ramp function of a ball ramp assembly of some embodiments is provided for further clarification. FIG. 9A is a front view of a ball ramp body 706 of an embodiment including a plurality of ball pockets 714 designed to receive at least a portion of a ball 710, such as but not limited to, a ball bearing. FIG. 9B illustrates the ball ramp body 706 being acted upon by an actuator that creates a force or movement designated as 700. This force or movement 700 creates a rotation 702 of the ball ramp body. FIG. 9C illustrates the balls 710 being positioned between the ball ramp body 706 and a fixed body 712. In embodiments either the fixed body 712 or the ball ramp body 706 will have either a ball pocket or ball ramp machined into it that a ball 710 is received in. Ball ramp body 706 may also have an associated ball ramp or ball pocket 708 machined into it in which the ball is also received in. Hence, embodiments include a fixed body 712 being fixed in location and ball ramp body 706 rotating relative to it and at least one of the fixed body 712 or the ball ramp body 706 containing a ball ramp. As the ball ramp 706 rotates, the balls 710 move with the ball ramp and create a linear movement and force designated as 704. The movement and force 704 is created by the ball moving on the ball ramp 708 generally represented in FIG. 9D. This linear movement and force 704 goes through the slides, bearings, springs and clutches as described above and engage either clutch 100 or clutch 200. To engage clutch 200 for example this linear movement would be moving bearing carrier 556 or 430 which in turn would push on bearing 228 which pushes on spring slide shoulder 232 which pushes on spring slide 230 which pushes on spring 218 which pushes on pressure plate 216 which pushes on reaction plates 212 which when enough force is applied works with friction plates 214 to deliver torque from the clutch basket 14 to the inner clutch basket 210 which delivers torque to outer transmission shaft 24 then to outer transmission shaft gear 26 and then to the rest of the transmission. Many different types of actuators can be used to create the movement/force 700 shown illustrated in FIG. 9B. These devices could be but are not limited to a linear actuator, electric machine with worm gear drive, electric machine with parallel axis drive, electric machine with right angle gear drive, slave cylinder.

This ball ramp function of a ball ramp assembly could also be set up where different parts rotate. FIG. 10A illustrates a front view of a non-rotational body 742 with ball pockets 744 that receive balls 740. FIG. 10B illustrates a ball ramp body 736 that acted upon by an actuator that creates a force or movement 730. This force or movement creates a rotation of the ball ramp designated as 732. This ball ramp body 736 typically has a bearing or anti-friction element 746 behind it to prevent axial movement as illustrated in FIG. 10C. Moreover in this embodiment, there is typically a non-rotational body 742 with either a ball pocket or ball ramp machined into it that the ball 740 is partially received in. Ball ramp body 736 also has a ball ramp 738 or ball pocket 744 machined into it. With the non-rotational body 742 being fixed in rotation but free in axial movement and ball ramp body 736 fixed in axial movement but free to rotate relative to the non-rotational body 742 and at least one of the non-rotational body 742 or the ball ramp body 736 containing a ball ramp 738 as the ball ramp body 736 rotates, the balls 740 move with the ball ramp 738 and create a linear movement and force 734 by axially moving the non-rotational body 742. This linear movement and force will go through the slides, bearings, springs and clutches as described above and engage either clutch 100 or clutch 200. A representation of the profile of the ball ramp is illustrated in FIG. 10D. To engage clutch 200 for example this linear movement would be moving bearing carrier 556 or 430 which in turn would push on bearing 228 which pushes on spring slide shoulder 232 which pushes on spring slide 230 which pushes on spring 218 which pushes on pressure plate 216 which pushes on reaction plates 212 which when enough force is applied works with friction plates 214 to deliver torque from the clutch basket 14 to the inner clutch basket 210 which delivers torque to outer transmission shaft 24 then to outer transmission shaft gear 26 and then to the rest of the transmission. Many different types of actuators can be used to create the movement/force 700 shown in FIG. 10B. As discussed above, the actuators may be, but are not limited, to a linear actuator, electric machine with worm gear drive, electric machine with parallel axis drive, electric machine with right angle gear drive, slave cylinder.

EXAMPLE EMBODIMENTS

Example 1 is a dual clutch that includes a first clutch, a second clutch, at least one ramp assembly and at least one actuator. The first clutch is configured to engage and disengage a first set of gears. The second clutch is configured to engage and disengage a second set of gears. The least one ramp assembly is configured to selectively activate at least one of the first clutch and the second clutch. The at least one ramp assembly includes a first member and a second member. The first member has at least one of at least one ball pocket and at least one ramp. The second member has at least one of at least one ball pocket and at least one ramp. The at least one actuator is configured and arranged to rotate one of the first member and the second member to cause the at least one ramp assembly to activate at least one of the first clutch and the second clutch.

Example 2, includes the dual clutch of Example 1, wherein the at least one ramp assembly is at least one ball ramp assembly and the at least one ramp is at least one ball ramp, dual clutch. The first member of the at least one ball ramp assembly further includes a middle bearing slide and a bearing carrier. The middle bearing slide has a plurality of spaced middle bearing slide ball pockets. The bearing carrier has a plurality of spaced bearing carrier ball pockets. The second member of the at least one ball ramp assembly includes a ball ramp body having a first ball ramp that is aligned with the plurality of spaced middle bearing slide ball pockets and a second ball ramp that is aligned with the plurality of spaced bearing carrier ball pockets. The at least one ramp assembly includes a first set of balls and a second set of balls. Each ball of the first set of balls is partially received in each spaced middle bearing slide ball pocket and the first ball ramp. Each ball in the second set of balls is partially received in each spaced bearing carrier ball pocket and the second ball ramp. The first ball ramp and the second ball ramp have select profiles that selectively generates a linear force as one of the ball ramp body, the middle bearing slide and the bearing carrier rotates in relation to at least one of the other ball ramp body, the middle bearing slide and the baring carrier.

Example 3 includes the dual clutch of any of the Examples 1-2, wherein the middle bearing slide includes a middle bearing slide anti-rotation member extending out from a perimeter of the middle bearing slide. The middle bearing slide anti-rotation member is configured and arranged to prevent rotation of the middle bearing slide. The bearing carrier includes a bearing carrier anti-rotation member extending out from a perimeter of the bearing carrier and a bearing carrier window. The middle bearing slide anti-rotation member of the middle bearing slide is received within the bearing carrier such that the middle bearing slide anti-rotation member middle bearing slide passes through the bearing carrier window of the bearing carrier. The bearing carrier anti-rotation member is configured and arranged to prevent rotation of the bearing carrier. The ball ramp body includes ball ramp gear teeth that are position proximate a portion of a perimeter of the ball ramp body. The ball ramp gear teeth are in operational communication with the at least one actuator such that activation of the at least one actuator causes the ball ramp body of the at least one ball ramp assembly to rotate.

Example 4 includes the dual clutch of Example 1, further wherein the at least one ramp assembly is at least one ball ramp assembly and the at least one ramp is at least one ball ramp. The first member of the at least one ball ramp assembly includes a transmission case. The transmission case has a first set of spaced inner case ball pockets and a second set of spaced outer case ball pockets. The second member of the at least one ball ramp assembly includes a middle bearing slide and a bearing carrier. The middle bearing slide has a middle bearing ball ramp. The middle bearing ball ramp is aligned with the first inner set of inner case ball pockets of the transmission. The bearing carrier has a bearing carrier ball ramp. The at least one ball ramp assembly includes a first set of balls and a second set of balls. The first set of balls is partially received in an inner case ball pocket of the first set of inner case ball pockets of the transmission case and the middle bearing ball ramp of the middle bearing slide. Each ball of the second set of balls is partially received in an outer case ball pocket of the outer case ball pockets of the transmission case and the bearing carrier ramp of the bearing carrier.

Example 5 includes the dual clutch of and of the Examples 1 and 4, wherein the at least one actuator further includes a first actuator and a second actuator. The first actuator is in operational communication with the middle bearing slide to selectively rotate the middle bearing slide in relation to the transmission case. The second actuator is in operational communication with the bearing carrier to selectively rotate the bearing carrier in relation to the transmission case.

Example 6 includes the dual clutch of any of the Examples 1 and 4-5, wherein the middle bearing slide includes middle bearing slide gear teeth that are positioned on a portion that extends from a perimeter of the middle bearing slide. The bearing carrier further includes a bearing carrier window. The middle bearing slide is received within the bearing carrier such that the portion of the middle bearing slide with the middle bearing slide gear teeth extends through the bearing carrier window of the bearing carrier. The bearing carrier further includes bearing carrier teeth. The first actuator is in operational communication with the middle bearing slide gear teeth to selectively rotate the middle bearing slide. The second actuator is in operational communication with the bearing carrier teeth of the bearing carrier to selectively rotate the bearing carrier.

Example 7 includes the dual clutch of any of the Examples 1-6, further including a clutch basket that is operationally coupled to receive torque from an engine. The first clutch including, a first inner clutch, a first stack of alternating friction plates and reaction plates, a first pressure plate and a first biasing member. The first inner clutch basket is received within the clutch basket. The first stack of alternating friction plates and reaction plates are received around a portion of the first inner clutch basket. The friction plates are locked to a rotation of the first inner basket and the reaction plates are locked to a rotation of the clutch basket. The first pressure plate is positioned adjacent the stack of alternating friction plates and reaction plates of the first clutch. The first biasing member is positioned to engage the first pressure plate. The ball ramp assembly is in operational communication with the first biasing member to selectively assert a linear force on the first biasing member to lock rotation of the friction plates with the reaction plates of the first clutch. The second clutch includes a second inner clutch basket, a second stack, a second pressure plate and a second biasing member. The second inner clutch basket is received within the clutch basket. The second stack of alternating friction plates and reaction plates are received around a portion of the second inner clutch basket. The friction plates are locked to the rotation of the first inner basket and the reaction plates locked to the rotation of the clutch basket. The second pressure plate is positioned adjacent the stack of alternating friction plates and reaction plates of the second clutch. The second biasing member is positioned to engage the second pressure plate. The ball ramp assembly is in operation communication with the second biasing member to selectively assert a linear force on the second biasing member to lock rotation of the friction plates with the reaction plates of the second clutch.

Example 8 is a dual clutch that includes a first clutch, a second clutch, at least one actuator and at least one actuator. The first clutch is configured to engage and disengage a first set of gears. The second clutch is configured to engage and disengage a second set of gears. The least one actuator is configured and arranged to engage a lever system to selectively activate the first and second clutch based on control signals from a transmission control module.

Example 9 includes the dual clutch of Example 8, wherein the lever system further includes at least one shift lever pivotally coupled to a case. The at least one actuator is configured and arranged to selectively pivot the at least one shifter to selectively activate the first and second clutch.

Example 10 includes the dual clutch of any of the Examples 8-9, wherein the at least one shift lever further includes s first shift lever, a second shift lever, a first actuator and second actuator. The first shift lever is in operational communication with the first clutch. The second shift lever is in operational communication with the second clutch. The at least one actuator further includes a first actuator and a second actuator. The first actuator is in operational communication with the first shift lever and the second actuator in operational communication with the second shift lever.

Example 11 includes the dual clutch of any of the Examples 8-10 wherein the lever system further includes at least one push rod, at least one biasing member and at least one pressure plate. The at least one push rod is in operational communication with the at least one shift lever. The at least one diaphragm biasing member is in operational communication with the at least push rod. The at least one pressure plate is in operational communication with the at least one biasing member. The at least one pressure plate in operational communication with at least one stack of friction and reaction plates of one of the first and second clutches.

Example 12 includes the dual clutch of any examples 8-11 further including a clutch basket. The clutch basket is operationally coupled to receive torque from an engine. The first clutch includes a first inner clutch basket, a first stack of alternating friction plates and reaction plates, a first pressure plate, a first biasing member. The first inner clutch basket is received within the clutch basket. The first stack of alternating friction plates and reaction plates are received around a portion of the first inner clutch basket. The friction plates are locked to a rotation of the first inner basket and the reaction plates locked to a rotation of the clutch basket. The first pressure plate is positioned adjacent the stack of alternating friction plates and reaction plates of the first clutch. The first biasing member is positioned to engage the first pressure plate. The lever system is in operational communication with the first biasing member to selectively assert a linear force on the first biasing member to lock rotation of the friction plates with the reaction plates of the first clutch. The second clutch includes a second inner clutch basket, a second stack of alternating friction plates and reaction plates, a second pressure plate and a second biasing member. The second inner clutch basket of the second clutch is received within the clutch basket. The second stack of alternating friction plates and reaction plates are received around a portion of the second inner clutch basket. The friction plates are locked to the rotation of the first inner basket and the reaction plates locked to the rotation of the clutch basket. A second pressure plate is positioned adjacent the stack of alternating friction plates and reaction plates of the second clutch. The second biasing member is positioned to engage the second pressure plate. The lever system is in operational communication with the second biasing member to selectively assert a linear force on the second biasing member to lock rotation of the friction plates with the reaction plates of the second clutch.

Example 13 is a vehicle including an engine, a transmission, a dual clutch, at least one actuator, at least one transmission control unit and at least one wheel. The engine is used to provide engine torque. The transmission is in operational communication with the engine to receive the engine torque. The transmission has a first set of gears and a second set of gears. The dual clutch includes a first clutch, a second clutch and at least one ball ramp assembly. The first clutch is configured to engage and disengage the engine torque to the first set of gears. The second clutch is configured to engage and disengage the engine torque to the second set of gears. The at least one ball ramp assembly is configured to selectively activate at least one of the first clutch and the second clutch. The at least one ball ramp assembly including at least one ball, a first member and a second member. The first member includes a ball pocket for each ball. The second member has at least one ball ramp. The at least one ball is partially received in an associated ball pocket and ball ramp. The at least one actuator is configured and arranged to rotate one of the first member and the second member to cause the at least one ball ramp assembly to activate at least one of the first clutch and the second clutch. The transmission control unit is configured to control operation of the at least one ball ramp assembly via the at least one actuator to selectively engage and disengage the first and second clutches. The at least one wheel operationally coupled to the at least one transmission.

Example 14 includes the vehicle of Example 13 wherein the dual clutch further includes the first member of the at least one ball ramp assembly including a middle bearing slide and a bearing carrier. The middle bearing slide has a plurality of spaced middle bearing slide ball pockets. The bearing carrier has a plurality of spaced bearing carrier ball pockets. The second member of the at least one ball ramp assembly includes a ball ramp body having a first ball ramp that is aligned with the plurality of spaced middle bearing slide ball pockets and a second ball ramp that is aligned with the plurality of spaced bearing carrier ball pockets. The at least one ball includes a first set of balls and a second set of balls. Each ball of the first set of balls is partially received in each spaced middle bearing slide ball pocket and the first ball ramp. Each ball in the second set of balls are partially received in each spaced bearing carrier ball pocket and the second ball ramp. The first ball ramp and the second ball ramp has select profiles that selectively generates a linear force as one of the ball ramp body, the middle bearing slide and the bearing carrier rotates in relation to each other.

Example 15 includes the vehicle of any of the Examples 13-14 wherein the dual clutch further includes a middle bearing slide, a bearing carrier and a ball ramp body. The middle bearing slide includes a middle bearing slide anti-rotation member extending out from a perimeter of the middle bearing slide. The middle bearing slide anti-rotation member is configured and arranged to prevent rotation of the middle bearing slide. The bearing carrier includes a bearing carrier anti-rotation member extending out from a perimeter of the bearing carrier and a bearing carrier window. The middle bearing slide anti-rotation member of the middle bearing slide is received with the bearing carrier such that the middle bearing slide anti-rotation member passes through the bearing carrier window of the bearing carrier. The bearing carrier anti-rotation member is configured and arranged to prevent rotation of the bearing carrier. The ball ramp body includes ball ramp gear teeth that are position proximate a portion of a perimeter of the ball ramp body. The ball ramp gear teeth are in operational communication with the at least one actuator such that activation of the at least one actuator causes the ball ramp body of the at least one ball ramp assembly to rotate.

Example 16 includes the vehicle of Example 13, wherein the dual clutch further includes the first member of the at least one ball ramp assembly includes a transmission case. The transmission case has a first set of spaced inner case ball pockets and a second set of spaced outer case ball pockets. The second member of the at least one ball ramp assembly includes a middle bearing slide and bearing carrier. The middle bearing slide has a middle bearing ball ramp. The middle bearing ball ramp is aligned with the first inner set of inner case ball pockets of the transmission. The bearing carrier has a bearing carrier ball ramp. The at least one ball of the at least one ball ramp assembly includes a first set of balls and a second set of balls. Each ball of the first set of balls is partially received in an inner case ball pocket of the first set of inner case ball pockets of the transmission case and the middle bearing ball ramp of the middle bearing slide. Each ball of the second set of balls is partially received in an outer case ball pocket of the outer case ball pockets of the transmission case and the bearing carrier ramp of the bearing carrier.

Example 17 includes the vehicle of any Examples 13 and 16 wherein the dual clutch further includes the at least one actuator further including a first actuator and a second actuator. The first actuator is in operational communication with the middle bearing slide to selectively rotate the middle bearing slide in relation to the transmission case. The second actuator is in operational communication with the bearing carrier to selectively rotate the bearing carrier in relation to the transmission case.

Example 18 includes the vehicle of any Examples 13 and 16-17 wherein the dual clutch further includes the middle bearing slide including middle bearing slide gear teeth that are positioned on a portion that extends from a perimeter of the middle bearing slide. The bearing carrier further includes a bearing carrier window. The middle bearing slide is received within the bearing carrier such that the portion of the middle bearing slide with the middle bearing slide gear teeth extends through the bearing carrier window of the bearing carrier. The bearing carrier further includes bearing carrier teeth. The first actuator is in operational communication with the middle bearing slide gear teeth to selectively rotate the middle bearing slide. The second actuator is in operational communication with the bearing carrier teeth of the bearing carrier to selectively rotate the bearing carrier.

Example 19 includes the vehicle of any Examples 13-18, further including a clutch basket that is operationally coupled to receive torque from the engine. The first clutch including, a first inner clutch, a first stack of alternating friction plates and reaction plates, a first pressure plate and a first biasing member. The first inner clutch basket is received within the clutch basket. The first stack of alternating friction plates and reaction plates are received around a portion of the first inner clutch basket. The friction plates are locked to a rotation of the first inner basket and the reaction plates are locked to a rotation of the clutch basket. The first pressure plate is positioned adjacent the stack of alternating friction plates and reaction plates of the first clutch. The first biasing member is positioned to engage the first pressure plate. The ball ramp assembly is in operational communication with the first biasing member to selectively assert a linear force on the first biasing member to lock rotation of the friction plates with the reaction plates of the first clutch. The second clutch includes a second inner clutch basket, a second stack, a second pressure plate and a second biasing member. The second inner clutch basket is received within the clutch basket. The second stack of alternating friction plates and reaction plates are received around a portion of the second inner clutch basket. The friction plates are locked to the rotation of the first inner basket and the reaction plates locked to the rotation of the clutch basket. The second pressure plate is positioned adjacent the stack of alternating friction plates and reaction plates of the second clutch. The second biasing member is positioned to engage the second pressure plate. The ball ramp assembly is in operation communication with the second biasing member to selectively assert a linear force on the second biasing member to lock rotation of the friction plates with the reaction plates of the second clutch.

Example 20 is a method of operating a dual clutch. The method includes, upon receiving an engagement signal for a select transmission gear associated with one of a first and a second clutch in the dual clutch, activating an actuator that is in operational communication with a ball ramp assembly. A first member of the ball ramp assembly is rotated as a result of the engagement signal to create a linear force with the ball ramp assembly. The created linear force is applied to the one of the first and second clutch to engage the select transmission gear.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A dual clutch comprising:
a first clutch configured to engage and disengage a first set of gears;
a second clutch configured to engage and disengage a second set of gears;
a ramp assembly configured to selectively activate at least one of the first clutch and the second clutch, the ramp assembly including,
a ball ramp body having a first ball ramp and a second ball ramp,
a bearing carrier having a plurality of spaced bearing carrier ball pockets, the bearing carrier further including a spring slide window and an extending bearing carrier anti-rotation member,
a middle bearing slide having a plurality of spaced middle bearing slide ball pockets, the middle bearing slide also having an extending middle bearing slide anti-rotation member; the middle bearing slide being positioned in relation with the bearing carrier so the middle bearing slide anti-rotation member of the middle bearing slide is received within the spring slide window of the bearing carrier,
the ball ramp body positioned so the first ball ramp is aligned with the plurality of spaced middle bearing slide ball pockets of the middle bearing slide and the second ball ramp is aligned with the plurality of spaced bearing carrier ball pockets of the bearing carrier,
a first set of balls, each ball of the first set of balls received within an associated middle bearing slide ball pocket of the plurality of spaced middle bearing slide ball pockets of the middle bearing slide and the first ball ramp of the ball ramp body,
a second set of balls, each ball of the second set of balls received within an associated bearing carrier ball pocket of the plurality of spaced bearing carrier ball pockets of the bearing carrier and the second ball ramp of the ball ramp body; and
at least one actuator configured and arranged to selectively rotate the ball ramp body to cause the ramp assembly to selectively activate at least one of the first clutch and the second clutch.

2. The dual clutch of claim 1, further comprising:
the first ball ramp and the second ball ramp having select profiles that selectively generates a linear force as the ball ramp body rotates in relation to at least one of the the middle bearing slide and the bearing carrier.

3. The dual clutch of claim 2, wherein:
the middle bearing slide anti-rotation member extends out from a perimeter of the middle bearing slide, the middle bearing slide anti-rotation member configured and arranged to prevent rotation of the middle bearing slide;
the bearing carrier anti-rotation member extending out from a perimeter of the bearing carrier, the bearing carrier anti-rotation member configured and arranged to prevent rotation of the bearing carrier; and
the ball ramp body including ball ramp gear teeth position proximate a portion of a perimeter of the ball ramp body, the ball ramp gear teeth in operational communication with the at least one actuator such that activation of the at least one actuator causes the ball ramp body of the at least one ball ramp assembly to rotate.

4. The dual clutch of claim 1, further comprising:
a clutch basket operationally coupled to receive torque from an engine;
the first clutch including,
a first inner clutch basket received within the clutch basket,
a first stack of alternating friction plates and reaction plates received around a portion of the first inner clutch basket, the friction plates locked to a rotation of the first inner basket and the reaction plates locked to a rotation of the clutch basket;
a first pressure plate positioned adjacent the stack of alternating friction plates and reaction plates of the first clutch;
a first biasing member positioned to engage the first pressure plate, the ball ramp assembly in operational communication with the first biasing member to selectively assert a linear force on the first biasing member to lock rotation of the friction plates with the reaction plates of the first clutch; and
the second clutch including,
a second inner clutch basket received within the clutch basket,
a second stack of alternating friction plates and reaction plates received around a portion of the second inner clutch basket, the friction plates locked to the rotation of the first inner basket and the reaction plates locked to the rotation of the clutch basket;
a second pressure plate positioned adjacent the stack of alternating friction plates and reaction plates of the second clutch; and
a second biasing member positioned to engage the second pressure plate, the ball ramp assembly in operation communication with the second biasing member to selectively assert a linear force on the second biasing member to lock rotation of the friction plates with the reaction plates of the second clutch.

5. A dual clutch comprising:
a first clutch configured to engage and disengage a first set of gears;

a second clutch configured to engage and disengage a second set of gears;
a ramp assembly configured to selectively activate at least one of the first clutch and the second clutch, the ramp assembly including,
    a transmission case, the transmission case having a first set of spaced inner case ball pockets and a second set of spaced outer case ball pockets;
    a middle bearing slide having a middle bearing ball ramp, the middle bearing ball ramp aligned with the first inner set of inner case ball pockets of the transmission, the middle bearing slide including middle bearing slide gear teeth that are positioned on a portion that extends from a perimeter of the middle bearing slide;
    a bearing carrier having a bearing carrier ball ramp, the bearing carrier further including a bearing carrier window, the middle bearing slide received within the bearing carrier such that the portion of the middle bearing slide with the middle bearing slide gear teeth extends through the bearing carrier window of the bearing carrier, the bearing carrier further including bearing carrier teeth;
    a first set of balls, each ball of the first set of balls partially received in an inner case ball pocket of the first set of inner case ball pockets of the transmission case and the middle bearing ball ramp of the middle bearing slide
    a second set of balls, each ball of the second set of balls partially received in an outer case ball pocket of the outer case ball pockets of the transmission case and the bearing carrier ramp of the bearing carrier;
    a first actuator being in operational communication with the middle bearing slide gear teeth to selectively rotate the middle bearing slide; and
    a second actuator being in operational communication with the bearing carrier teeth of the bearing carrier to selectively rotate the bearing carrier.

6. A vehicle comprising;
an engine to provide engine torque;
a transmission in operational communication with the engine to receive the engine torque, the transmission having a first set of gears and a second set of gears;
a dual clutch including,
a first clutch configured to engage and disengage the engine torque to the first set of gears;
a second clutch configured to engage and disengage the engine torque to the second set of gears;
a ball ramp assembly configured to selectively activate at least one of the first clutch and the second clutch, the ball ramp assembly including,
    a middle bearing slide having a plurality of spaced middle bearing slide ball pockets, the middle bearing slide including a middle bearing slide anti-rotation member extending out from a perimeter of the middle bearing slide, the middle bearing slide anti-rotation member configured and arranged to prevent rotation of the middle bearing slide,
    a bearing carrier having a plurality of spaced bearing carrier ball pockets, the bearing carrier including a bearing carrier anti-rotation member extending out from a perimeter of the bearing carrier and a bearing carrier window, the middle bearing slide anti-rotation member of the middle bearing slide received with the bearing carrier such that the middle bearing slide anti-rotation member passes through the bearing carrier window of the bearing carrier, the bearing carrier anti-rotation member configured and arranged to prevent rotation of the bearing carrier,
    a ball ramp body having a first ball ramp that is aligned with the plurality of spaced middle bearing slide ball pockets and a second ball ramp that is aligned with the plurality of spaced bearing carrier ball pockets,
    a first set of balls, each ball of the first set of balls partially received in each spaced middle bearing slide ball pocket and the first ball ramp, and
    a second set of balls, each ball in the second set of balls partially received in each spaced bearing carrier ball pocket and the second ball ramp, the first ball ramp and the second ball ramp having select profiles that selectively generates a linear force as one of the ball ramp body, the middle bearing slide and the bearing carrier rotates in relation to each other;
at least one actuator configured and arranged to rotate the ball ramp body to cause the ball ramp assembly to activate at least one of the first clutch and the second clutch;
a transmission control unit configured to control operation of the ball ramp assembly via the at least one actuator to selectively engage and disengage the first and second clutches; and
at least one wheel operationally coupled to the at least one transmission.

7. The vehicle of claim 6, wherein
the ball ramp body including ball ramp gear teeth position proximate a portion of a perimeter of the ball ramp body, the ball ramp gear teeth being in operational communication with the at least one actuator such that activation of the at least one actuator causes the ball ramp body of the at least one ball ramp assembly to rotate.

8. The vehicle of claim 6, wherein the dual clutch further comprises:
a clutch basket operationally coupled to receive torque from the engine;
the first clutch including,
    a first inner clutch basket received within the clutch basket,
    a first stack of alternating friction plates and reaction plates received around a portion of the first inner clutch basket, the friction plates locked to a rotation of the first inner basket and the reaction plates locked to a rotation of the clutch basket;
    a first pressure plate positioned adjacent the stack of alternating friction plates and reaction plates of the first clutch;
    a first biasing member positioned to engage the first pressure plate, the ball ramp assembly in operational communication with the first biasing member to selectively assert a linear force on the first biasing member to lock rotation of the friction plates with the reaction plates of the first clutch; and
the second clutch including,
    a second inner clutch basket received within the clutch basket,
    a second stack of alternating friction plates and reaction plates received around a portion of the second inner clutch basket, the friction plates locked to the rotation of the first inner basket and the reaction plates locked to the rotation of the clutch basket;
    a second pressure plate positioned adjacent the stack of alternating friction plates and reaction plates of the second clutch; and a second biasing member positioned to engage the second pressure plate, the ball ramp assembly in operation communication with the second biasing member to selectively assert a linear force on the second biasing member to lock rotation of the friction plates with the reaction plates of the second clutch.

\* \* \* \* \*

UNITED STATES PATENT AND TRADEMARK OFFICE
CERTIFICATE OF CORRECTION

PATENT NO. : 10,626,929 B2  
APPLICATION NO. : 15/590906  
DATED : April 21, 2020  
INVENTOR(S) : Younggren et al.

Page 1 of 1

It is certified that error appears in the above-identified patent and that said Letters Patent is hereby corrected as shown below:

In the Claims

Column 26 Claim 2 Line 10 and 11, delete "at least one of the the middle bearing with" and insert -- at least one of the middle bearing --

Signed and Sealed this
Tenth Day of September, 2024

Katherine Kelly Vidal  
*Director of the United States Patent and Trademark Office*